United States Patent
DeLoach et al.

(10) Patent No.: US 11,859,845 B1
(45) Date of Patent: Jan. 2, 2024

(54) NETWORKED HVAC SYSTEM HAVING LOCAL AND NETWORKED CONTROL

(71) Applicant: RENU, INC., Carrollton, TX (US)

(72) Inventors: Richard Zane DeLoach, Wentzville, MO (US); Paul Edward Reeves, Oakville (CA); Sean Burke, Morgan Hill, CA (US); Sanjiv Sirpal, Oakville (CA); Mohammad Aliakbari Miyanmahaleh, Dallas, TX (US); Ehsan Taghavi, North York (CA); Brian Reeves, Hamilton (CA); Taylor Michael Keep, Berkeley, CA (US)

(73) Assignee: Renu, Inc., Carrollton, TX (US)

( * ) Notice: Subject to any disclaimer, the term of this patent is extended or adjusted under 35 U.S.C. 154(b) by 0 days.

(21) Appl. No.: 16/734,097

(22) Filed: Jan. 3, 2020

Related U.S. Application Data

(60) Provisional application No. 62/788,314, filed on Jan. 4, 2019, provisional application No. 62/788,334, filed
(Continued)

(51) Int. Cl.
*F24F 11/54* (2018.01)
*F24F 11/58* (2018.01)
(Continued)

(52) U.S. Cl.
CPC .............. *F24F 11/54* (2018.01); *F24F 11/46* (2018.01); *F24F 11/58* (2018.01); *F24F 11/64* (2018.01);
(Continued)

(58) Field of Classification Search
CPC ...................................................... F24F 11/54
See application file for complete search history.

(56) References Cited

U.S. PATENT DOCUMENTS

| 2,612,095 A | 9/1952 | Kennedy |
| 2,658,440 A | 11/1953 | Lange |

(Continued)

FOREIGN PATENT DOCUMENTS

| CN | 104465638 | 3/2015 |
| CN | 108369039 B | 7/2020 |

(Continued)

OTHER PUBLICATIONS

Non-Final Office Action dated Feb. 25, 2020, U.S. Appl. No. 16/250,727, filed Jan. 17, 2019, applicant: Juntao Zhang, 21 pages.
(Continued)

*Primary Examiner* — Nathan L Laughlin
(74) *Attorney, Agent, or Firm* — Haverstock & Owens, A Law Corporation

(57) ABSTRACT

A networked HVAC system is implemented as part of a multi-unit dwelling. At least one HVAC unit is installed within each unit of the multi-unit dwelling. Each individual HVAC unit includes a localized HVAC unit controller, which is connected to an external network. The HVAC unit controller also can be connected to any other controllable HVAC devices in the unit, such as an exhaust fan. The HVAC system addresses the open-loop issue by monitoring temperature, air flow, humidity, air pressure, occupancy, window open/close state, and HVAC units of all units in a multi-unit dwelling, as well as common areas, and optimizing operating parameters to minimize wide swings in operational states and managing the overall system of multiple units/common areas so that energy usage and temperature/ventilation control is optimized. The HVAC system also enables learning and predictive modeling for adapting to real-time and anticipated condition requirements within each zone.

21 Claims, 15 Drawing Sheets

Related U.S. Application Data on Jan. 4, 2019, provisional application No. 62/788,342, filed on Jan. 4, 2019, provisional application No. 62/788,350, filed on Jan. 4, 2019, provisional application No. 62/940,779, filed on Nov. 26, 2019.

(51) Int. Cl.
  *F24F 11/64* (2018.01)
  *F24F 11/46* (2018.01)
  *F24F 110/20* (2018.01)
  *F24F 110/10* (2018.01)

(52) U.S. Cl.
  CPC ....... *F24F 2110/10* (2018.01); *F24F 2110/20* (2018.01)

(56) References Cited

U.S. PATENT DOCUMENTS

| | | | |
|---|---|---|---|
| 3,063,357 A | 11/1962 | Eberhart | |
| 3,623,419 A | 11/1971 | Taylor | |
| 3,703,141 A | 11/1972 | Pernoud | |
| 3,877,356 A | 4/1975 | Bruns | |
| 3,908,750 A | 9/1975 | Siegel | |
| 5,115,616 A | 5/1992 | Nixon | |
| 5,301,744 A | 4/1994 | Derks | |
| 5,396,779 A | 3/1995 | Voss | |
| 6,371,637 B1 | 4/2002 | Atchinson | |
| 6,574,975 B2 | 6/2003 | Bourne et al. | |
| 6,701,741 B2 | 3/2004 | Liu | |
| 9,011,216 B1 | 4/2015 | Al-Alusi | |
| 9,086,226 B2 * | 7/2015 | Bauer | F24F 11/74 |
| 9,429,923 B2 | 8/2016 | Ward | |
| 9,519,874 B2 | 12/2016 | Macek | |
| 9,772,116 B2 | 9/2017 | Hester | |
| 9,869,484 B2 | 1/2018 | Hester et al. | |
| 9,933,177 B2 | 4/2018 | Hester et al. | |
| 10,094,586 B2 | 10/2018 | Pavlovski | |
| 10,136,549 B2 | 11/2018 | Steiner | |
| 10,571,414 B2 | 2/2020 | Turner | |
| 10,708,077 B2 | 7/2020 | Cui | |
| 11,098,921 B2 | 8/2021 | Ellis | |
| 11,143,423 B2 | 10/2021 | Li | |
| 11,156,572 B2 | 10/2021 | Buda | |
| 2004/0007981 A1 | 1/2004 | Shibata | |
| 2004/0194484 A1* | 10/2004 | Zou | F24F 11/30 62/186 |
| 2006/0099904 A1* | 5/2006 | Belt | G05D 23/1932 454/236 |
| 2007/0138307 A1 | 6/2007 | Khoo | |
| 2010/0141153 A1 | 6/2010 | Recker | |
| 2010/0262298 A1 | 10/2010 | Johnson | |
| 2011/0227489 A1 | 9/2011 | Huynh | |
| 2012/0162965 A1 | 6/2012 | Takeuchi | |
| 2012/0259469 A1 | 10/2012 | Ward | |
| 2012/0299489 A1 | 11/2012 | Sakuragi | |
| 2013/0173064 A1 | 7/2013 | Fadell | |
| 2014/0087158 A1 | 3/2014 | Ciuperca | |
| 2014/0175996 A1 | 6/2014 | Yoon | |
| 2014/0249876 A1 | 9/2014 | Wu | |
| 2014/0260034 A1 | 9/2014 | Ciuperca | |
| 2015/0032264 A1* | 1/2015 | Emmons | F24F 11/62 700/276 |
| 2015/0043212 A1 | 2/2015 | Coffey | |
| 2015/0204600 A1 | 7/2015 | Fay | |
| 2016/0123619 A1 | 5/2016 | Hester | |
| 2016/0201933 A1 | 7/2016 | Hester | |
| 2016/0201934 A1 | 7/2016 | Hester | |
| 2016/0209059 A1* | 7/2016 | Castillo | H04L 12/2825 |
| 2016/0223214 A1 | 8/2016 | Turner | |
| 2016/0223216 A1 | 8/2016 | Buda | |
| 2016/0305678 A1 | 10/2016 | Pavlovski | |
| 2016/0034137 A1 | 11/2016 | Dekker | |
| 2017/0003039 A1 | 1/2017 | Lazzari | |
| 2017/0074534 A1 | 3/2017 | Turner | |
| 2017/0138542 A1 | 5/2017 | Gielen | |
| 2017/0146261 A1 | 5/2017 | Rogers et al. | |
| 2018/0004172 A1 | 1/2018 | Patel | |
| 2018/0202678 A1 | 7/2018 | Ahuja | |
| 2018/0206414 A1 | 7/2018 | Goodman | |
| 2018/0335220 A1 | 11/2018 | Matambo | |
| 2018/0363893 A1 | 12/2018 | Cheng | |
| 2019/0078801 A1 | 3/2019 | Turney et al. | |
| 2019/0103182 A1 | 4/2019 | Borshch | |
| 2019/0120438 A1 | 4/2019 | Wan | |
| 2019/0158305 A1 | 5/2019 | Cui | |
| 2019/0166661 A1 | 5/2019 | Gao | |
| 2019/0309975 A1 | 10/2019 | Salem | |
| 2019/0338974 A1 | 11/2019 | Turney | |
| 2019/0338975 A1 | 11/2019 | Ray | |
| 2019/0353378 A1 | 11/2019 | Ramamurti | |
| 2019/0353384 A1 | 11/2019 | Laughman | |
| 2019/0360711 A1 | 11/2019 | Sohn | |
| 2020/0088427 A1 | 3/2020 | Li | |
| 2020/0256581 A1 | 8/2020 | Wang | |
| 2020/0355391 A1 | 11/2020 | Wenzel | |
| 2021/0011443 A1 | 1/2021 | McNamara | |
| 2021/0018205 A1 | 1/2021 | Ellis | |
| 2021/0018211 A1 | 1/2021 | Ellis | |
| 2021/0025617 A1* | 1/2021 | Hamada | F24F 7/007 |
| 2021/0055011 A1 | 2/2021 | Smith | |
| 2021/0102722 A1 | 4/2021 | Nabi | |
| 2021/0140660 A1 | 5/2021 | Kogo | |
| 2021/0140671 A1 | 5/2021 | Francis | |
| 2021/0173366 A1 | 6/2021 | Turney | |
| 2021/0191348 A1 | 6/2021 | Lee | |
| 2021/0270487 A1 | 9/2021 | Salem | |
| 2021/0285671 A1 | 9/2021 | Du | |
| 2021/0325072 A1 | 10/2021 | Lin | |
| 2021/0364181 A1 | 11/2021 | Risbeck | |

FOREIGN PATENT DOCUMENTS

| | | |
|---|---|---|
| JP | 3608500 B2 | 1/2005 |
| JP | 3686195 B2 | 8/2005 |
| JP | 2008215807 A | 9/2008 |
| JP | 2015094558 A | 5/2015 |
| JP | 2019113214 A | 7/2019 |

OTHER PUBLICATIONS

Notice of Allowance dated Jun. 11, 2019, U.S. Appl. No. 16/197,003, filed Jan. 20, 2018, Applicant: Shanfu Gao, 15 pages.
Office action dated Feb. 1, 2022 in U.S. Appl. No. 16/734,119.
Liu, Weiwei, Zhiwei Lian and Bo Zhao. "A neural network evaluation model for individual thermal comfort." Energy and Buildings 39.10 (2007): 1115-1122. (Year: 2007).

* cited by examiner

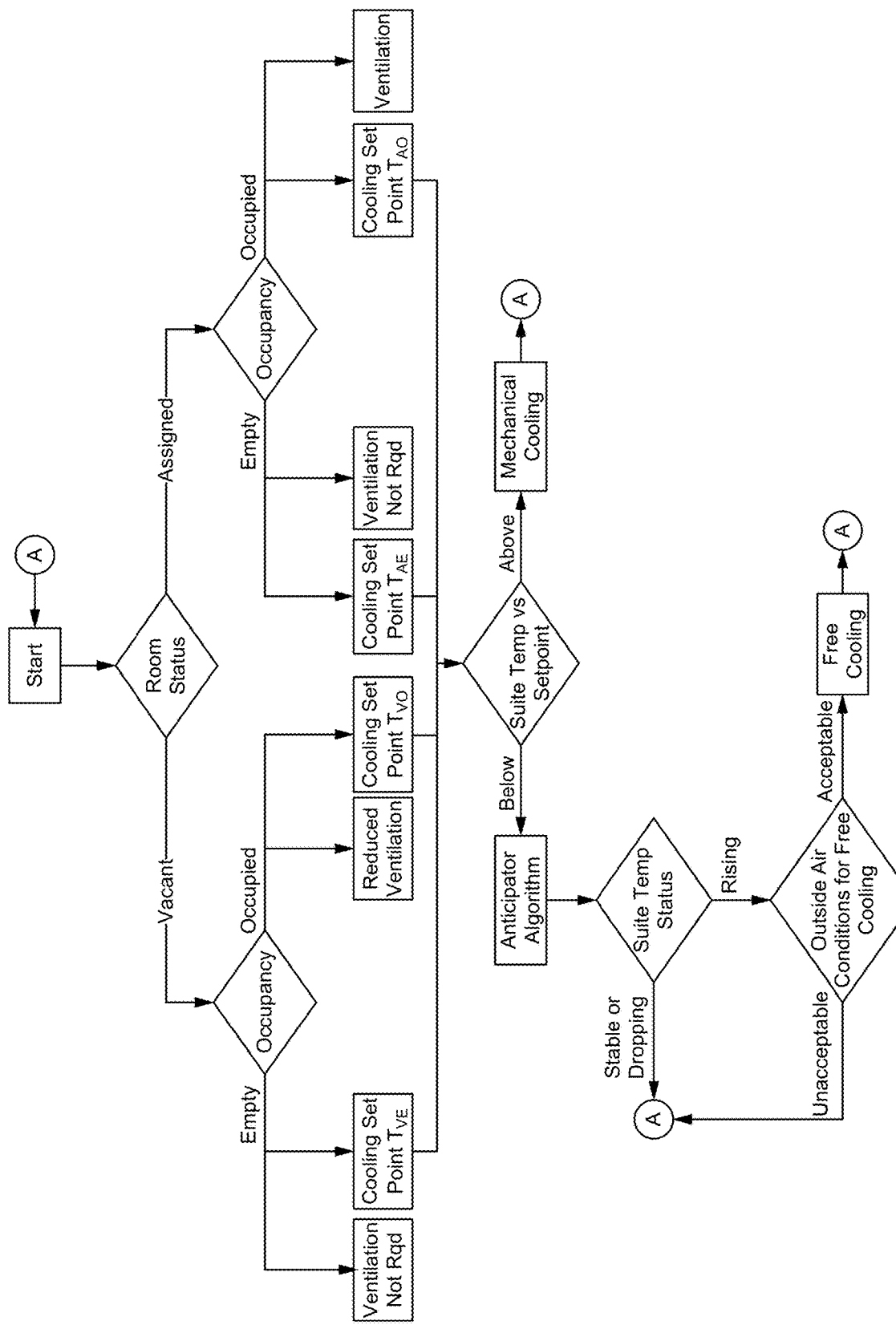

| Room Status | Occupancy | Temp Setpoint | Ventilation | Cooling | Damper Position | Exhaust Fan | Comment |
|---|---|---|---|---|---|---|---|
| Vacant | Empty | $T_{3c}$ | Not required | Yes | Normally Closed or Minimal Open | Normally Off | Ventilation may be appropriate if room not occupied for long period of time. |
| Vacant | Occupied | $T_{so}$ | Minimal | Yes | Normally Closed or Minimal Open | Normally Off | Maintenance, etc. |
| Assigned | Empty | $T_{3c}$ | Not Required | Yes | Normally Closed or Minimal Open | Normally Off | Set point above guest desired temp set point |
| Assigned | Occupied | $T_{so}$ | Required | Yes | Minimal Open to Max Open | Normally Off or On as Needed | Guest desired temp set point |

Fig. 10

NETWORKED HVAC SYSTEM HAVING LOCAL AND NETWORKED CONTROL

RELATED APPLICATIONS

This Patent Application claims priority under 35 U.S.C. 119(e) of the co-pending U.S. provisional patent application, Application Ser. No. 62/788,314, filed on Jan. 4, 2019, and entitled "HVAC Control System", U.S. provisional patent application, Application Ser. No. 62/788,334, filed on Jan. 4, 2019, and entitled "HVAC System with Modular Architecture", U.S. provisional patent application, Application Ser. No. 62/788,342, filed on Jan. 4, 2019, and entitled "HVAC System with Single Piece Body", U.S. provisional patent application, Application Ser. No. 62/788,350, filed on Jan. 4, 2019, and entitled "HVAC System with Coil Arrangement in Blower Unit", and U.S. provisional patent application, Application Ser. No. 62/940,779, filed on Nov. 26, 2019, and entitled "HVAC Architecture and Control System", which are each hereby incorporated in their entireties by reference.

FIELD OF THE INVENTION:

The present invention is generally directed to a HVAC (Heating, Ventilating, and Air Conditioning) system. More specifically, the present invention is directed to a networked HVAC system having local and networked control.

BACKGROUND OF THE INVENTION:

An air conditioning system typically includes an evaporator coil, a condenser, an accumulator, a condensor, and a metering device. The components are interconnected by pipes or tubing, and separate fans move air across the evaporator coil and the condenser. A refrigerant is in various phases as it flows through the air conditioning components. Circulating refrigerant vapor enters the compressor and is compressed to a higher pressure, resulting in a higher temperature as well. The compressed refrigerant vapor is now at a temperature and pressure at which it can be condensed and is routed through the condenser. In the condenser, the compressed refrigerant vapor flows through condenser coils. A condenser fan blows air across the condenser coils thereby transferring heat from the compressed refrigerant vapor to the flowing air. Cooling the compressed refrigerant vapor condenses the vapor into a liquid. The condensed refrigerant liquid is output from the condenser to the accumulator where the condensed refrigerant liquid is pressurized. The condensed and pressurized refrigerant liquid is output from the accumulator and routed through the metering device where it undergoes an abrupt reduction in pressure. That pressure reduction results in flash evaporation of a part of the liquid refrigerant, lowering its temperature. The cold refrigerant liquid/vapor is then routed through the evaporator coil. The result is a mixture of liquid and vapor at a lower temperature and pressure. The cold refrigerant liquid-vapor mixture flows through the evaporator coil and is completely vaporized by cooling the surface of the evaporator coil and cooling air moving across the evaporator coil surface. The resulting refrigerant vapor returns to the compressor to complete the cycle.

In a single unit dwelling, certain components of the air conditioning system are located inside the house and other components are located outside, for example the condenser and condenser fan are located outside the unit and the remaining components are located inside. Typically, the inside components are co-located with the furnace, related air moving components, and air ducts associated with the house's HVAC system. However, in multi-unit dwellings, such as apartment or condominium complexes, separate positioning of the air conditioning components both inside and outside of each unit is not always feasible. Integrated, box-like, air conditioning devices are often used. Such devices can be mounted in windows or custom sized wall openings, with a portion of the device extending into the living area and another portion extending outside beyond an outer wall of the unit.

Current HVAC systems, especially for multi-unit dwellings, are not well coordinated and often work in opposition to one-another. This results in energy inefficiency, unstable temperatures, excessive drafts, and a reduced level of comfort due to noise, drafts, and temperature variations. The root of the problem occurs because the various components of the system, whether they be of a single unit (e.g. HVAC, thermostat, ventilation unit/bath fan/fumehood) or a system from a multitude of units along with equivalent common area units, are operating in open loop with respect to one another. For example, an HVAC unit in a residential unit may be operating excessively because the ventilation fan is creating negative pressure, thus pulling in warm air from corridors or the outside.

SUMMARY OF THE INVENTION:

Embodiments are directed to a networked HVAC system implemented as part of a multi-unit dwelling. At least one HVAC unit is installed within each unit of the multi-unit dwelling. In some embodiments, multiple HVAC units are installed in one or more of the units, where each unit is divided into multiple different zones and there is one HVAC unit associated with each zone. Each individual HVAC unit includes a localized HVAC unit controller. The HVAC unit controller can be connected to an external network, such as a cloud based network. The HVAC unit controller can also be connected to any other controllable HVAC devices in the unit, such as an exhaust fan. In the case of a multi-zone unit configuration having multiple HVAC units, each HVAC unit controller can be locally interconnected, such as by bluetooth, wi-fi, or wired connections, to share control data and control signaling. The HVAC system addresses the open-loop issue by monitoring temperature, air flow, humidity, air pressure, occupancy, window open/close state, and HVAC units of all units in a multi-unit dwelling, as well as common areas, and optimizing not only a single unit's operating parameters to minimize wide swings in operational states, but managing the overall system of multiple units/common areas, so that energy usage and temperature/ventilation control is optimized. The HVAC system enables learning and predictive modeling for adapting to real-time and anticipated condition requirements within each zone.

In an aspect, a HVAC system is disclosed that includes a plurality of discrete HVAC units and a plurality of sensors. Each HVAC unit is configured to condition a zone associated with the HVAC unit, and each of the plurality of HVAC units are networked together. Each HVAC unit comprises an HVAC unit controller, one or more controllable HVAC components, and a network interface. The network interface is configured to transmit zone condition data of the zone associated with the corresponding HVAC unit and HVAC component operational state data of the corresponding HVAC unit to each of the other HVAC units, and to receive zone condition data and HVAC component operational state data from each of the other HVAC units. For each HVAC unit the corresponding HVAC unit controller is configured to control the corresponding controllable HVAC components according to the zone condition data and the operation state data corresponding to the HVAC unit and according to the zone condition data and the operational state data received from the other HVAC units. A plurality of sensors are positioned in each zone. Each sensor is coupled to the HVAC unit controller of the HVAC unit associated with the zone, and is configured to sense a condition characteristic of the zone and transmit corresponding sensed zone condition data to the HVAC unit controller. In some embodiments, the condition characteristic is one of a temperature, humidity, or air flow rate. In some embodiments, each of the plurality of HVAC units are networked together by a wired or wireless connection. In some embodiments, each of the plurality of HVAC units are networked together by an external network. In some embodiments, each of the plurality of HVAC units are connected to the external network by a wired or wireless connection. In some embodiments, the external network comprises a central controller. In some embodiments, each of the plurality of HVAC units is configured to transmit zone condition data and HVAC component operational state data to the central controller. In some embodiments, the central controller is configured to distribute zone condition data and HVAC component operational state data received from each of the plurality of HVAC units to each of the other HVAC units. In some embodiments, the central controller is further configured to transmit rule sets to each of the plurality of HVAC units, wherein each rule set defines how each specific HVAC unit is to utilize and implement the zone condition data and HVAC component operational state data received from each of the other HVAC units. In some embodiments, each HVAC unit further comprises a human-machine interface for receiving user input that sets one or more zone conditions to a specific value. In some embodiments, the HVAC unit controller of each HVAC unit is configured to apply programmed logic and stored control algorithms and state tables to determine control signaling for the one or more controllable HVAC components. In some embodiments, the one or more controllable HVAC components comprise a compressor, a metering device, a blower fan for blowing air over an evaporator coil, a condenser fan, and a balancing damper positioned proximate the air intake opening.

In another aspect, another HVAC system is disclosed that includes an HVAC unit and an exhaust device. The HVAC unit is configured to condition air within a zone. The HVAC unit comprises an HVAC unit controller, one or more controllable HVAC components, and an air intake opening for in-taking air external to the zone in response to the operation of one of the one more controllable HVAC components. The exhaust device is positioned within the zone and is coupled to the HVAC unit controller. The local exhaust device is configured to exhaust air from the zone in response to a control signal received from the HVAC unit controller. In some embodiments, the HVAC system further comprises one or more sensors positioned within the zone and coupled to the HVAC controller. In some embodiments, the HVAC unit controller is configured to operate the one of the one or more controllable HVAC components in response to sensing a sensed condition within the zone. In some embodiments, the HVAC unit controller is configured send the control signal to the exhaust device in response to sensing a sensed condition within the zone. In some embodiments, the one or more controllable HVAC components comprise a compressor, a metering device, a blower fan for blowing air over an evaporator coil, a condenser fan, and a balancing damper positioned proximate the air intake opening. In some embodiments, the one of the one or more controllable HVAC components is a balancing damper.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures:

FIG. 9 illustrates an exemplary control algorithm used by the HVAC unit controller to implement intelligent ventilation and free cooling using the joint ventilation system according to some embodiments.

FIG. 10 illustrates an exemplary state table according to some embodiments.

DETAILED DESCRIPTION OF THE EMBODIMENTS:

Embodiments of the present application are directed to an HVAC system. Those of ordinary skill in the art will realize that the following detailed description of the HVAC system is illustrative only and is not intended to be in any way limiting. Other embodiments of the HVAC system will readily suggest themselves to such skilled persons having the benefit of this disclosure.

Reference will now be made in detail to implementations of the HVAC system as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
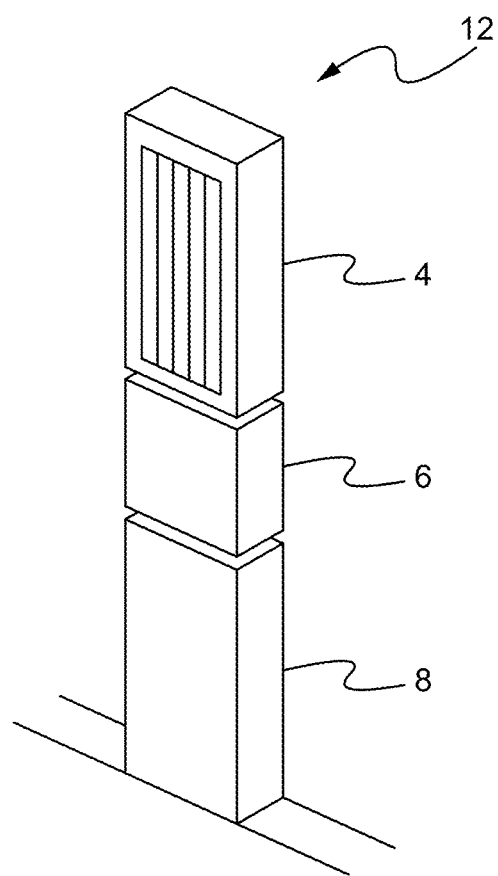
FIG. 1 illustrates a perspective view of the HVAC unit as assembled according to some embodiments.

FIG. 1 illustrates a perspective view of an individual HVAC unit 12 as assembled according to some embodiments. In some embodiments, the HVAC unit 12 is installed within the preexisting framing of a wall, although as shown in FIG. 1 this framing is removed to better illustrated the HVAC unit as assembled. The HVAC unit 12 can include three sub-assemblies: an indoor air cycling section 4, a mechanical section 6, and an outdoor air cycling section 8. The indoor air cycling section, or simply "indoor section", cycles air from an interior area of a unit (indoors) and back out to the interior area. The outdoor air cycling section, or simply "outdoor section", cycles air from an area exterior to the unit (outdoors) and back out to the exterior area.

In an application where air conditioning cooling is performed, the indoor section functions as an evaporator section, and the outdoor section functions as a condenser section. It is understood that the HVAC unit also can be used for heating, in which case the functionality of the indoor section and the outdoor section can be reversed from that described regarding an evaporator section and a condenser section. Subsequent discussion may be directed to air conditioning cooling and therefore reference is made in those occurrences to an evaporator section and a condenser section. It is understood that such description can be generally applied to an indoor section and an outdoor section that performs a heating function.

The evaporator section 4 includes a heat exchanger, an air mover, and electrical circuitry. In some embodiments, the heat exchanger includes an evaporator coil and interconnecting refrigerant tubing. In some embodiments, the air mover includes a motor and a fan. In some embodiments, the electrical circuitry includes power wiring, control wiring, and control/diagnostic sensors. The mechanical section 6 includes refrigerant loop components, in-line components, and electrical circuitry including HVAC unit control. In some embodiments, the refrigerant loop components include a compressor and a metering device, such as an electronic expansion valve. In some embodiments, the in-line components include one or more valves, one or more filters, and interconnecting refrigerant tubing. In some embodiments, the electrical circuitry of the mechanical section includes HVAC unit controls, electrical components, power wiring, control wiring, and control/diagnostics sensors. The condenser section 8 includes a heat exchanger, an air mover, an auxiliary heating component, air quality components, and electrical circuitry. In some embodiments, the heat exchanger of the condenser section includes a condenser coil and interconnecting refrigerant tubing. The condenser section can also include an accumulator. In some embodiments, the air mover in the condenser section includes a motor and a fan. In some embodiments, the auxiliary heating component includes one or more resistive heating elements. In some embodiments, the air quality components include an air filter and ventilation components. In the some embodiments, the electrical circuitry of the condenser section includes power wiring, control wiring, and control/diagnostic sensors.

Figure 2:
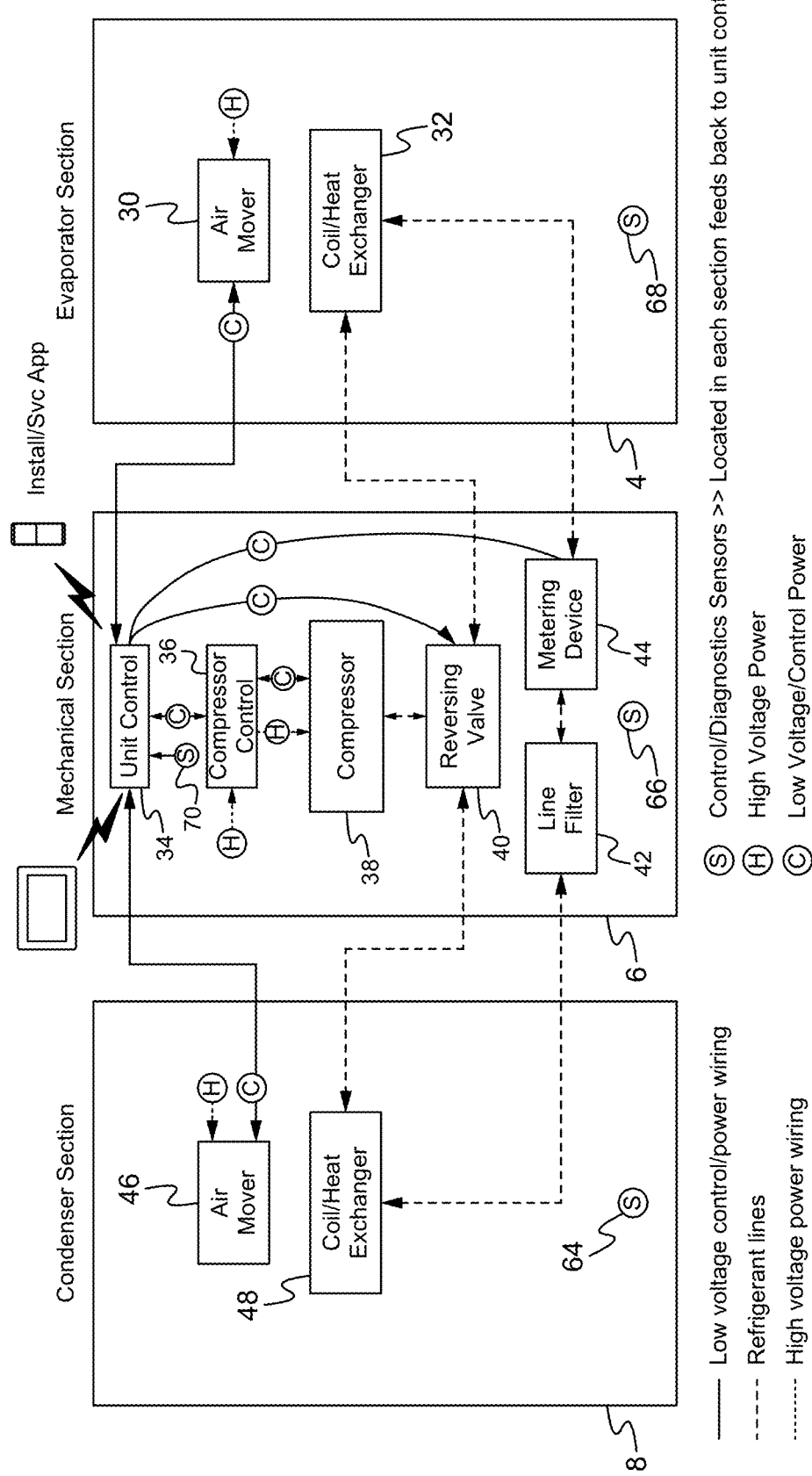
FIG. 2 illustrates a schematic block diagram of the HVAC unit and constituent components corresponding to air conditioning functionality according to some embodiments.

FIG. 2 illustrates a schematic block diagram of the HVAC unit 12 and constituent components corresponding to air conditioning functionality according to some embodiments. A heat exchanger 32 including an evaporator coil in the evaporator section 4 is coupled to a compressor 38 via interconnecting refrigerant tubing and one or more valves 40. The compressor 38 is coupled to a heat exchanger 48 including a condenser coil in the condenser section 8 via interconnecting refrigerant tubing and the one or more valves 40. The heat exchanger 48 can also include an accumulator (not shown) that is coupled to the condenser coil via interconnecting refrigerant tubing. The heat exchanger 48 is coupled to a metering device 44 via interconnecting refrigerant tubing, one or more valves, and filters 42. The metering device 44 is coupled to the heat exchanger 32 via interconnecting refrigerant tubing. In this manner a refrigerant loop is formed, where the refrigerant loop includes the evaporator coil in the heat exchanger 32, the compressor 38, the condenser coil and the accumulator in the heat exchanger 48, the metering device 44, and the interconnecting pipes, valves, and filters. It is understood that the number and configuration of interconnecting refrigerant tubing, valves, and filters shown in FIG. 2 is for exemplary purposes only and that alternative configurations are also contemplated for interconnecting the heat exchanger 32, the compressor 38, the heat exchanger 48, and the metering device 40. It is also understood that the direction of refrigerant flow can be one direction for cooling functionality (air conditioning) and the other direction for heating functionality.

An air mover 30 in the evaporator section 4 is coupled to the heat exchanger 32 to blow air over the evaporator coil, and an air mover 46 in the condenser section 8 is coupled to the heat exchanger 48 to blow air over the condenser coil. A compressor controller 36 is coupled to the compressor 38. An HVAC unit controller 34 is coupled to the air mover 30, the compressor controller 36, the one or more valves such as valves 40, the metering device 44, and the air mover 46. Control signaling, indicated by "C" in FIG. 2, is transmitted between the compressor controller 36 and the compressor 38, and between the HVAC unit controller 34 and the air mover the compressor controller 36, the one or more valves such as valves 40, the metering device 44, and the air mover 46. In some embodiments, the compressor controller 36 can be integrated as part of the HVAC unit controller 34. Control/diagnostic sensors 64, 66, 68, 70 can be used to sense various ambient conditions, such as temperature or humidity, which are connected back to the HVAC unit controller 34 and can be used to control the various components of the HVAC unit 12. High voltage power, such as 120 VAC, is supplied to each of the air mover 30, the compressor controller 36, and the air mover 46. High voltage power can be supplied from the compressor controller 36 to the compressor 38. High voltage power input is indicated by "H" in FIG. 2. Low voltage power is supplied to the unit controller 34. Low voltage power can be provided via wiring labeled "C". It is understood that alternative power supply configurations are also contemplated.

Figure 3:
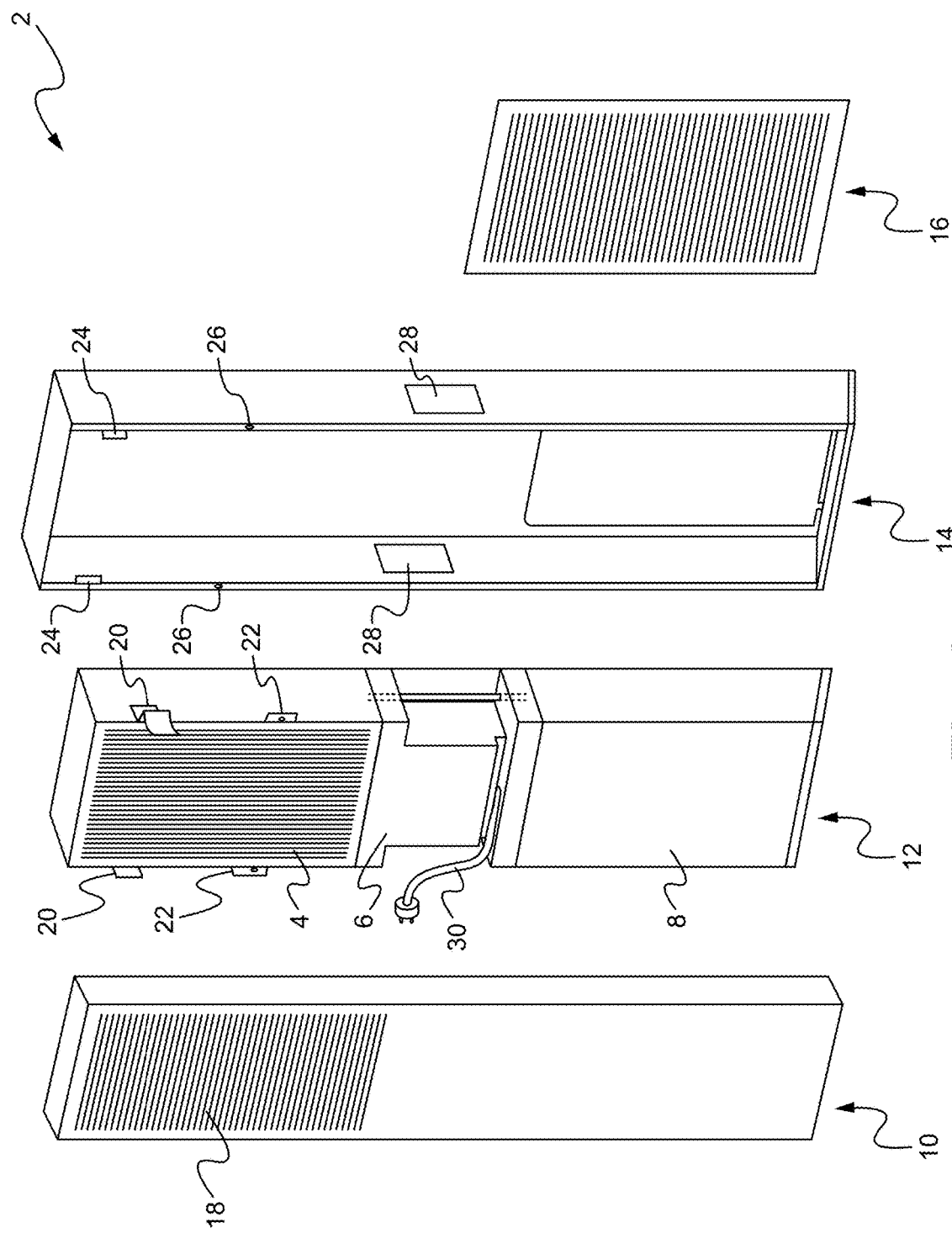
FIG. 3 illustrates an exploded view of an HVAC system having a single piece HVAC unit according to some embodiments.

The HVAC unit controller 34 is connected to a human-machine interface (HMI), also referred to as a user interface, that can be installed on a front side of the HVAC unit (FIG. 3).

User interface with the HVAC unit controller 34 also can be made using an installation/service application included on a mobile device. The HVAC unit controller 34 is also connected to the HVAC system via a network connection, either wired or wireless.

In some embodiments, air filters are included as part of the evaporator section 4 and the condenser section 8. Air is drawn into the evaporator section 4, such as from the unit in which the HVAC unit is installed, directed across the evaporator coil, and output from the evaporator section 4 back into the unit. The air filter can be positioned at an air intake portion of the evaporator section 4 such that air is filtered prior to being blown across the evaporator coil. Similarly, air is drawn into the condenser section 8, such as from outside the unit within which the HVAC unit is installed, directed across the condenser coil, and output from the condenser section 8 back outside the unit. The air filter can be positioned at an air intake portion of the condenser section 8 such that air is filtered prior to being blown across the condenser coil.

In some embodiments, the HVAC unit is an integrated single unit that includes the evaporator section, the mechanical section, and the condenser section integrated as a single piece body. In other embodiments, the HVAC unit is an assembly of distinct modular units where the evaporator section is implemented as an evaporator modular unit, the mechanical section is implemented as a mechanical modular unit, and the condenser sector is implemented as a condenser modular unit. The evaporator section, the mechanical section, and the condenser section are described above as each having specific components. It is understood that this is for exemplary purposes only and that one or more components may be positioned in different sections of the HVAC unit. The HVAC unit is also described as a vertical stack where the evaporator section is positioned on top of the mechanical section which is positioned on top of the condenser section. It is understood that the sections can be alternatively arranged, for example the evaporator section can be positioned on top of the condenser section which is positioned on top of the mechanical section.

Figure 4:
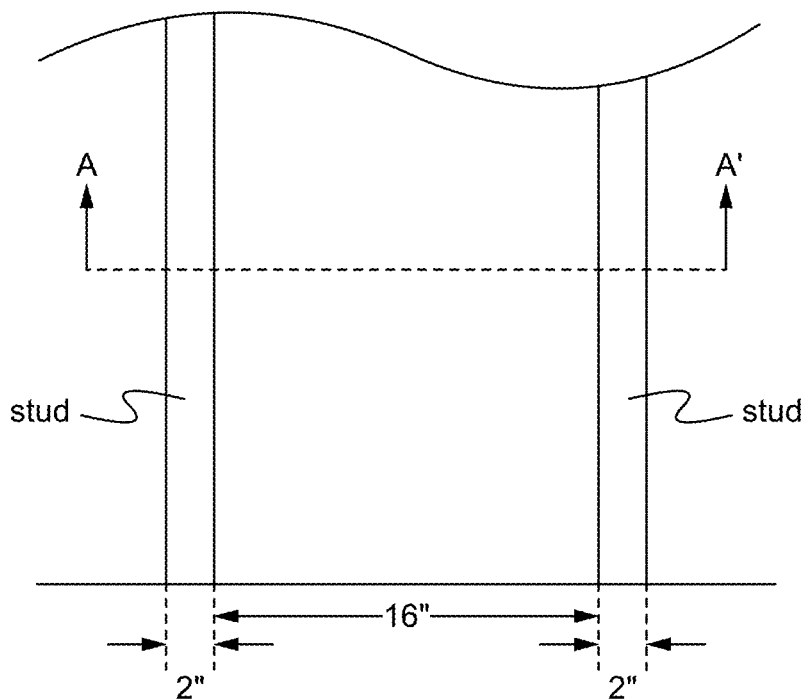
FIG. 4 illustrates an exemplary preexisting framework into which the HVAC system can be installed according to some embodiments.
Figure 5:
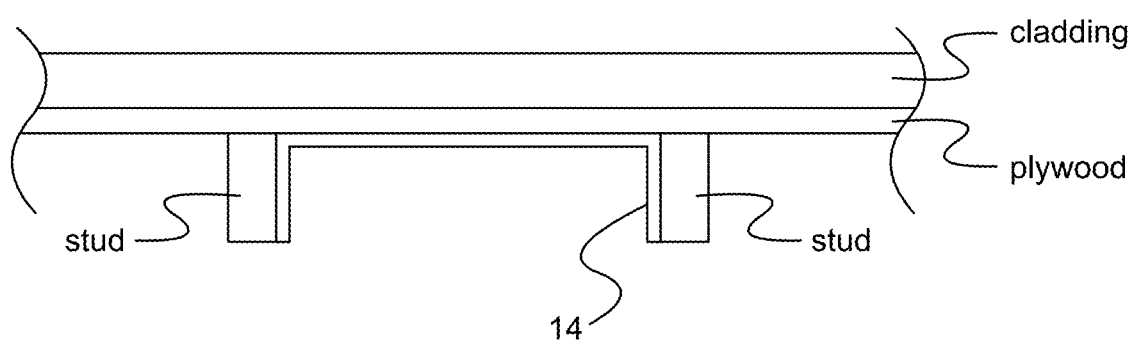
FIG. 5 illustrates a top down view of the mounting sleeve mounted in a preexisting framework of a wall according to some embodiments.

The HVAC unit is mounted within a mounting sleeve, and a front side access panel and a back side grille are attached to cover exposed portions of the HVAC unit. Henceforth, the HVAC unit, the mounting sleeve, the front side access panel, and the back side grille are collectively referred to as the HVAC unit. FIG. 3 illustrates an exploded view of an HVAC unit including a mounting sleeve, a front side access panel, and a back side grille according to some embodiments. The HVAC unit includes a front side access panel 10, the HVAC unit 12, a mounting sleeve 14, and a back side grille 16. The mounting sleeve 14 is configured to be mounted between preexisting framework of a dwelling, such as a room of an apartment or condominium. In an exemplary application, the mounting sleeve fits between two adjoining studs in a wall. FIG. 4 illustrates an exemplary preexisting framework into which the HVAC unit can be installed according to some embodiments. The preexisting framework can be an exposed portion of a wall. As shown in FIG. 4, the exposed portion of the wall has the drywall removed from an interior side of the room, thereby exposing adjacent studs and the area in between. The area between the adjacent studs is void of insulating material, electrical wiring, plumbing, and the like so as to enable positioning and mounting of the mounting sleeve 14 within this area. The mounting sleeve 14 is sized to fit conventional framing configurations. For example, a conventional opening between adjacent studs is 16". FIG. 5 illustrates a top down view of the mounting sleeve mounted in a preexisting framework of a wall according to some embodiments. The top down view shown in FIG. 5 corresponds to the cross-section A-A' shown in FIG. 4. A back side of the area between the studs may include plywood, cladding, and/or other materials known in the art. In an exemplary configuration, a back side surface that is exposed within the area between adjacent studs is made of plywood. The mounting sleeve 14 is configured to fit within the area between adjacent studs and against the back side surface. In some embodiments, the mounting sleeve 14 is secured to the adjacent studs using screws. The mounting sleeve 14 can include holes to receive the screws, or the screws can be screwed in directly through the mounting sleeve material, forming holes as the screws are applied. In some embodiments, the mounting sleeve 14 is also secured to the back side surface of the preexisting framework in a manner similar to that of the studs. It is understood that alternative techniques can be used to secure the mounting sleeve to the preexisting framework.

In some embodiments, one or both of the adjacent studs are configured with a power outlet, such as an AC voltage wall socket, or include a hole through which electrical wiring can be strung to access a power outlet. The mounting sleeve 14 can be configured with one or more side openings, such as side openings 28 shown in FIG. 3, coincident with the power outlets on one or both of the adjacent studs. The side openings 28 enable the HVAC unit 12 to access the power outlet(s) and connect to power. In some embodiments, the HVAC 12 includes a power cord and plug 30 configured for connecting to a conventional power outlet, such as the AC voltage wall socket, which provides the high voltage power "H".

The HVAC unit 12 and the mounting sleeve 14 each include complementary mounting apparatuses for mounting the HVAC unit 12 to the mounting sleeve 14. In the exemplary configuration shown in FIG. 3, the mounting sleeve 14 includes holes 26 in the side walls and also includes flanges 24 that extend from the side walls. The HVAC unit 12 includes mounting tabs 20 configured to mate to the flanges 24 in the mounting sleeve 14. The HVAC unit 12 also includes flanges 22 with holes where screws or fasteners, such as quarter turn fasteners, can be inserted into the holes 26 of the mounting sleeve 14. The holes 26 can be screw holes for accepting screws or fasteners. It is understood that additional mounting tab/flange and/or flange/screw hole combinations can be used, or only mounting tab/flange or only flange/screw hole implementations can be used. It is further understood that alternative complementary mounting apparatuses can be used to mount the HVAC unit 12 to the mounting sleeve 14. The front side access panel 10 is attached to the interior facing portion of the HVAC unit 12. The front side access panel 10 includes a front side grille 18 that enables air to cycle from an interior area of a unit (indoors) and back out to the interior area. The back side grille 16 is attached on an exterior surface of the dwelling.

The physical positioning, relative alignment, and dimensions of each of the individual components in each of the evaporator section 4 and the condenser section 8 can vary according to numerous different configurations and applications. In some embodiments, the air mover is positioned to a lateral side of the heat exchanger, i.e. horizontal to the heat exchanger, in either or both of the evaporator section 4 and the condenser section 8. Alternatively to a lateral configuration, a stacked configuration can be used where the air mover is positioned above or below the heat exchanger, i.e. vertical to the heat exchanger, in either or both of the evaporator section 4 and the condenser section 8. Examples of both a lateral configuration and a stacked configuration are described in the co-pending U.S. patent application Ser. No. 16/733,716 entitled "HVAC System with Coil Arrangement in Blower Unit", which is hereby incorporated in its entirety by reference.

As described above, the HVAC unit controller is configured to provide control and power management to the various components of the HVAC unit. In some embodiments, the HVAC unit controller includes a processing control board that includes logic and control circuitry for receiving and processing sensed data from a variety of different types of sensors, applying programmed logic and stored control algorithms and state tables to determine control signaling for the various components in the HVAC unit, and generating and transmitting such determined control signaling to the appropriate HVAC components. In some embodiments, the processing control board includes a microprocessor, a CPU (central processing unit), or other similar type processing circuitry and/or integrated circuit for executing the control algorithms and state tables used to operate and control the HVAC unit. The control algorithms and state tables can be stored locally on the processing board or on a separate storage medium accessible by the processing circuitry. The state table defines controllable actions to be taken based on current determined states of the controllable HVAC components and the various received sensed data. In some embodiments, the state tables include fixed instructions for states of the controllable components of the HVAC unit. In other embodiments, the state tables include equations. In still other embodiments, the state tables include tunable thresholds and equations that can be altered. The controllable HVAC components of the HVAC unit, subject to control by the HVAC unit controller, include, but are not limited to the air mover in the evaporator section, e.g. a blower fan, the air mover in the condenser section, e.g. a condenser fan, the compressor, the metering device, the reversing valve and other controllable valves, as well as, a human-machine interface and exhaust fan where applicable. The HVAC unit controller also includes a first motor driver circuit coupled to the blower fan and a second motor driver circuit coupled to the condenser fan. The first motor driver circuit can be implemented as part of the processing control board or can be implement as a separate first motor driver board under control of the processing control board. Similarly, the second motor driver circuit can be implemented as part of the processing control board or can be implement as a separate second motor driver board under control of the processing control board. The HVAC unit controller can also include an inverter driver circuit coupled to the compressor. The inverter driver circuit can be implemented as part of the processing control board or can be implement as a separate inverter driver circuit board under control of the processing control board. It is understood that other controllable HVAC components can be implemented as part of the HVAC unit under control of the HVAC unit controller. Sensor lines are implemented such that all sensors send sensed data to the HVAC unit controller. Control lines are implemented such that the HVAC unit controller sends control signals to each controllable component in the HVAC unit, either directly or indirectly through a relay or a driver circuit. The control lines can also be used to send control signals to one or more of the sensors, such as to poll, tune, etc.

Figure 6:
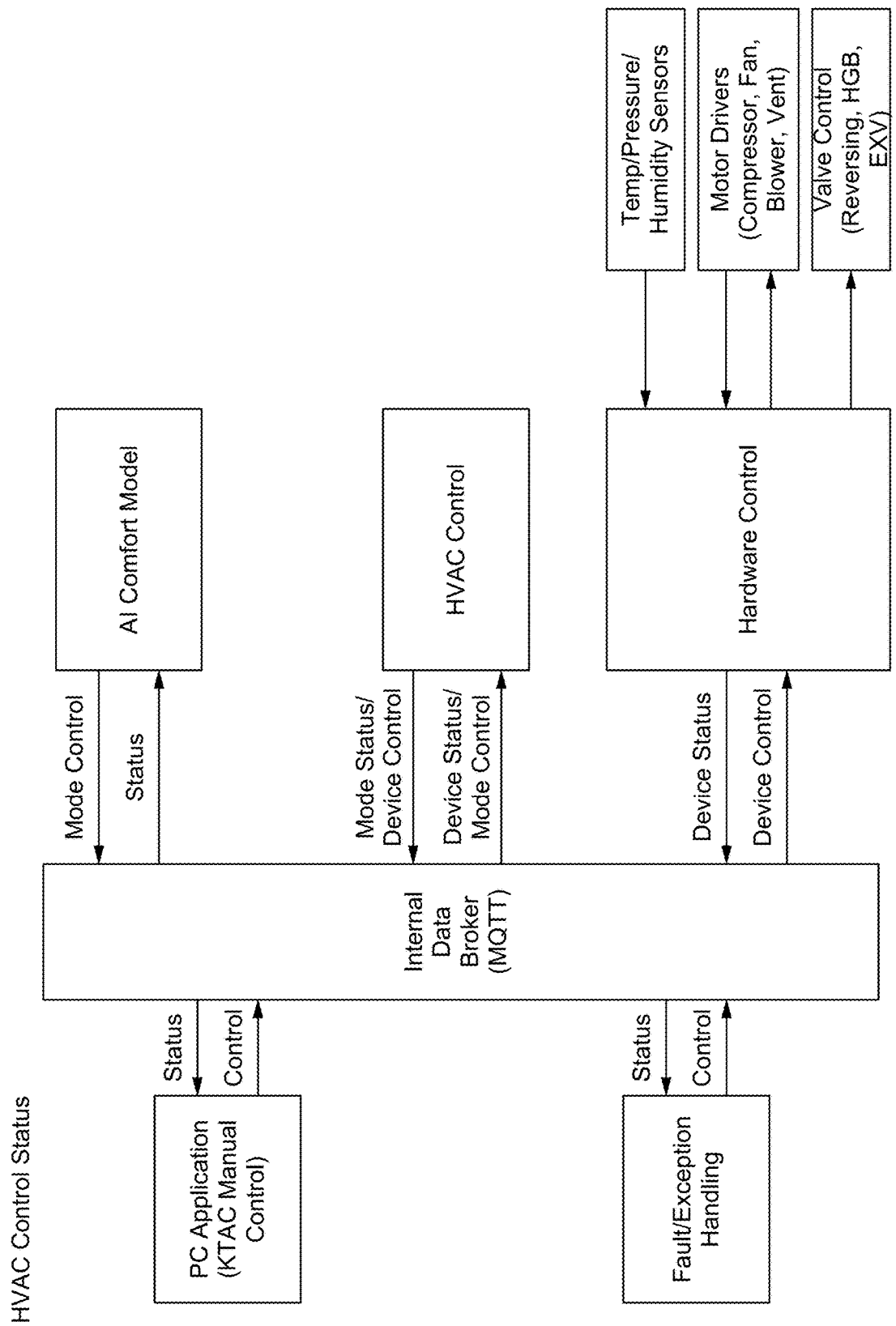
FIG. 6 illustrates a conceptual block diagram of control algorithms of the HVAC unit controller according to some embodiments.

In addition to receiving sensed data and implementing control of the hardware components of the HVAC unit, the HVAC unit control is configured to implement control algorithms and state tables to determine control signaling for the various components in the HVAC unit. The control architecture of the HVAC unit controller can be conceptually segmented into separate control modules. FIG. 6 illustrates a conceptual block diagram of control algorithms of the HVAC unit controller according to some embodiments. The control algorithms are segmented as a hardware control module, an HVAC control module, and an AI (artificial intelligence) comfort module. Additional control algorithms can be implemented for human-machine interface (manual control) and fault/exception handling. Data transfer and control signaling between the various modules is implemented by an internal data broker. The hardware control module is a control algorithm for directly interfacing and controlling the discrete HVAC components including the various sensors, the motor drivers, such as for the compressor, air movers, and exhaust fan, and valves. The HVAC control module is a control algorithm for determining the specific controllable actions to be implemented by the hardware control module. The controllable actions define specific actions to be performed by specific components in the HVAC unit for implementing the HVAC functions, such as heating, cooling, ventilation, de-humidification, etc., as determined by comfort and environmental models. The AI comfort model is a control algorithm that utilizes the comfort and environmental models to determine what conditions are to be met and the specific statuses of the various HVAC components necessary for implementing such conditions. The comfort and environmental models and related conditions to be met will be described in greater detail to follow. Conceptually, the HVAC control module knows and manages the HVAC unit, while the AI control module knows and manages the space to be conditioned by the HVAC unit. The AI comfort module determines a specific condition to be met and utilizes state tables to determine the specific statuses of the specific HVAC components to achieve the specific condition. The current statuses of the specific HVAC components are compared to the specific statuses to be met. The AI comfort module determines mode controls for changing the modes of the specific HVAC components to meet the specific condition, and the mode controls are sent to the HVAC control module. The HVAC control module in turn determines the appropriate device control instructions for the HVAC components, and the device control instructions are sent to the hardware control module. The hardware control module in turn controls the appropriate HVAC components by implementing the received device control instructions.

Figure 7:
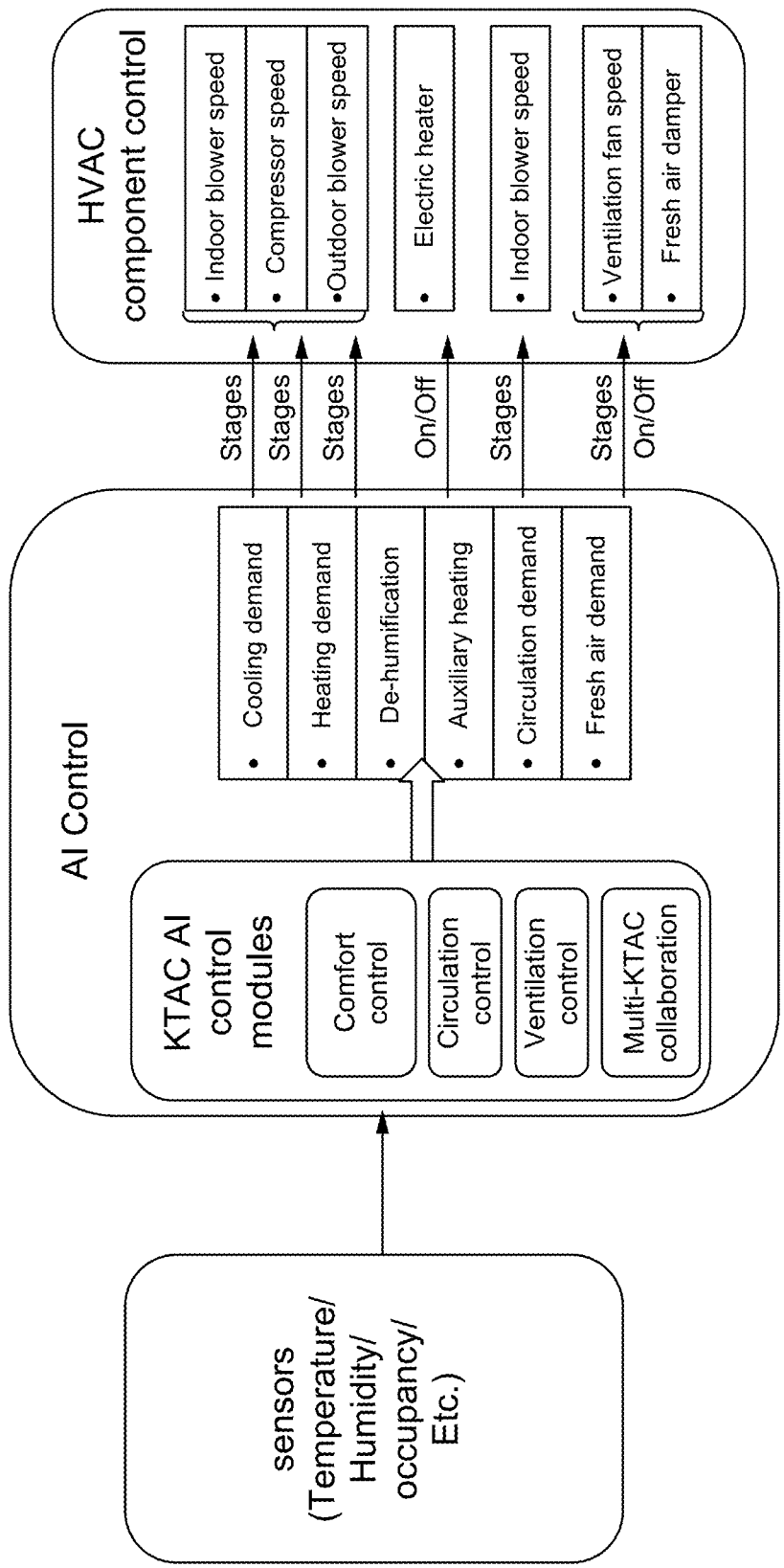
FIG. 7 illustrates a functional block diagram of exemplary implementation of the control algorithms with controllable HVAC components according to some embodiments.

FIG. 7 illustrates a functional block diagram of exemplary implementation of the control algorithms with controllable HVAC components according to some embodiments. In this exemplary implementation, sensed data is received by various sensors, such as temperature, humidity, occupancy, etc., and supplied to the HVAC unit controller for utilization and implementation by the control algorithms. The various control algorithms can include a comfort control algorithm, a circulation control algorithm, a ventilation control algorithm, and in the case of multiple HVAC units networked together a multi-HVAC unit collaboration algorithm. Each of these exemplary control algorithms can be implemented by the AI comfort module, the HVAC control module, and the hardware control module of FIG. 6 to meet various conditions including, but not limited to, cooling demand, heating demand, de-humidification, auxiliary heating, circulation demand, and fresh air demand. The conditions are met by generating control signaling for specific HVAC components. Exemplary control signaling and associated controllable HVAC component actions include electing between different stages of operating indoor blower speed, compressor speed, outdoor blower speed, electric heater, ventilation fan speed, and fresh air damper. The different stages of operation can be implemented for HVAC components that have variable speed or dual-speed operation, such as fans or compressors, which can be selectively controlled for multiple different operational speeds (stages). A stage of operation can also refer to the ON or OFF state of the HVAC component.

The HVAC unit controller and corresponding control algorithms can be used to implement a wide variety of intelligent decision making tools. One such tool is an intelligent ventilation capability. The HVAC unit can be configured to include outdoor ventilation. Input air from the interior of the unit is drawn into the evaporator section through the front side grille of the front side access panel. The input air passes across the heat exchanger, such as an evaporator coil, and is directed via an air plenum back out the evaporator section through the front side grille as output air. Outdoor ventilation can be provided at the back side of the evaporator section via a back side opening in the mounting sleeve and the back wall of the unit. Alternatively, outdoor ventilation can be provided at the back side of the condenser section via a back side opening in the mounting sleeve and the back wall of the unit, and the exterior air is ducted to the evaporator section. In some embodiments, a balancing damper and an air filter are positioned at the back side opening, and a balancing damper is positioned proximate the front side grille. Either or both of the balancing dampers can be automated under the control of the HVAC unit controller. Baffles in the balancing dampers enable mixing of the input air with ambient air from the exterior, which enables the outside air to be conditioned prior to being input into the unit and/or enables control of the air temperature of the air passing across the heat exchanger.

Figure 8:
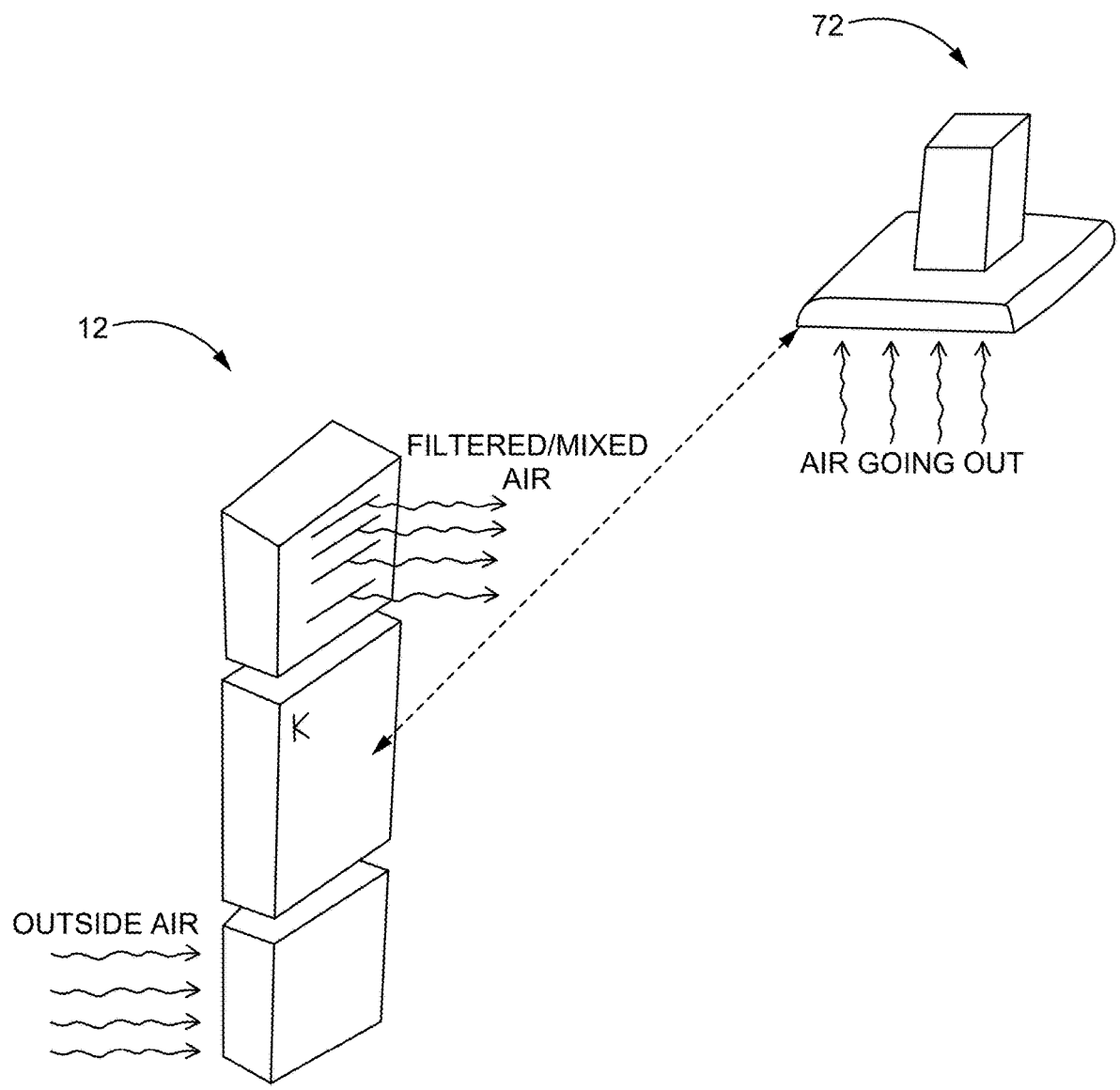
FIG. 8 illustrates an implementation of the joint ventilation system according to some embodiments.

In some embodiments, a joint ventilation system can be configured between the HVAC unit and an arbitrary number of extra exhaust fans. The joint ventilation system can manage the air temperature and humidity within the unit using the outside air, when possible. The joint ventilation system can also maintain a positive pressure inside the unit. FIG. 8 illustrates an implementation of the joint ventilation system according to some embodiments. In this exemplary configuration, there is a single exhaust fan 72. It is understood that more than one exhaust fan can be used. The HVAC unit controller in the HVAC unit 12 is coupled to the exhaust fan 72 using either a wired or wireless connection to control the state of the exhaust fan. Under control of the HVAC unit controller, the exhaust fan 72 and the outdoor ventilation of the HVAC unit are controlled to bring in air from outside the unit or vent air outside as determined. The HVAC unit controller sends ON/OFF or variable speed state signals to the exhaust fan according to sensor readings from one or more sensors, such as temperature sensors, humidity sensors, enthalpy sensors, or occupancy sensors positioned inside and outside the unit. The HVAC unit controller can use the sensor readings to compare the indoor and outdoor conditions, and decide on using the air from outside the unit and/or venting inside air to the outside. Using the joint ventilation system, the HVAC unit controller can provide real-time coordination with exhaust fans, moderate and control exhaust fan output, condition the inside air using the outside air, and maintain positive air pressure within the unit. There also may be controllable plenums or dampers in the HVAC unit and/or the exhaust fans to regulate an air flow rate.

FIG. 9 illustrates an exemplary control algorithm used by the HVAC unit controller to implement intelligent ventilation and free cooling using the joint ventilation system according to some embodiments. The control algorithm is implemented in accordance with a corresponding state table. FIG. 10 illustrates an exemplary state table according to some embodiments. In this example, sensor data from a unit occupancy sensor and sensor data from a unit temperature sensor are utilized. The control algorithm of FIG. 9 shows one example of use for determining room occupancy and for implementing ventilation/cooling procedures in accordance with state conditions defined in the state table of FIG. 10. It is understood that the state table shown in FIG. 10 is not intended to show all possible states and related actions.

Figure 11:
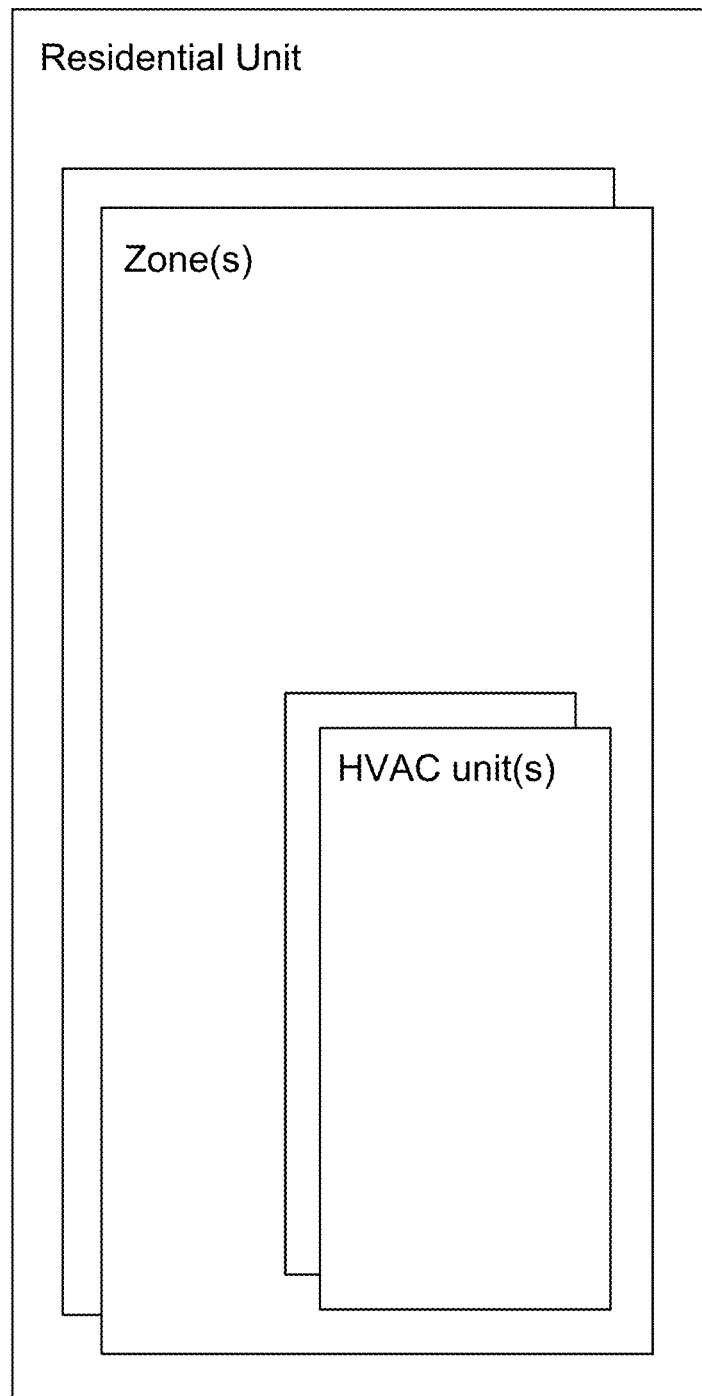
FIG. 11 illustrates a conceptual block diagram of a multiple HVAC unit configuration implemented in a single unit according to some embodiments.

In the above described implementations, operation in relation to a single HVAC unit installed in a single room of unit within a dwelling. The concepts and descriptions above also can be applied to a multiple HVAC unit configuration where the multiple HVAC units are networked together. The multiple HVAC unit configuration can be implemented in a variety of different ways. In some embodiments, multiple HVAC units can be configured within a unit having only a single room. In such an implementation, the single room can be conceptually segmented into different areas, or zones, and a discrete HVAC unit is positioned within each zone. In other embodiments, multiple HVAC units can be configured within a unit having multiple rooms. In this case, each room can be conceptually considered a zone or each room can be conceptually segmented into different zones, and a discrete HVAC unit is positioned within each zone. In still other embodiments, multiple HVAC units can be configured within a building having multiple units, where each unit may include a single room configured as a single zone, a single room configured as multiple zones, or multiple rooms where each room is configured as either a single zone or multiple zones. Common areas within the building also can be configured as zones, each zone having its own HVAC unit. In such an implementation, a discrete HVAC unit is positioned within each zone. In general, each zone represents a physical or logical space within a unit. FIG. 11 illustrates a conceptual block diagram of a multiple HVAC unit configuration implemented in a single unit according to some embodiments. In this example, a unit includes two different zones and two discrete HVAC units, one HVAC unit per zone. It is understood that the concept can be expanded to more than two zones per unit. Each zone can represent a different area in a single room, or each zone can represent a different room. The unit and zones configuration represents a provisioning hierarchy where each zone can be separately controlled under a coordinated control. Each discrete HVAC unit has connectivity to controllable HVAC components within the zone, such as sensors or exhaust fans, monitors its corresponding zone conditions according to one or more sensors positioned within the zone, and provides provisioning (control) of the controllable HVAC components. Each HVAC unit also includes network interfacing and control capabilities for networking with the other HVAC unit associated with the unit. Control algorithms within the HVAC unit can be used to implement local control over each zone. Such control can be implemented using current temperature readings, predefined temperature set points, zone occupancy readings, predefined or dynamically adjusted zone scheduling models, and predefined macros. Data can be exchanged between HVAC units to implement unit level provisioning including, but not limited to, predefined macros, home versus away occupancy models, time scheduling models, and modes such as comfort versus energy efficiency.

Figure 12:
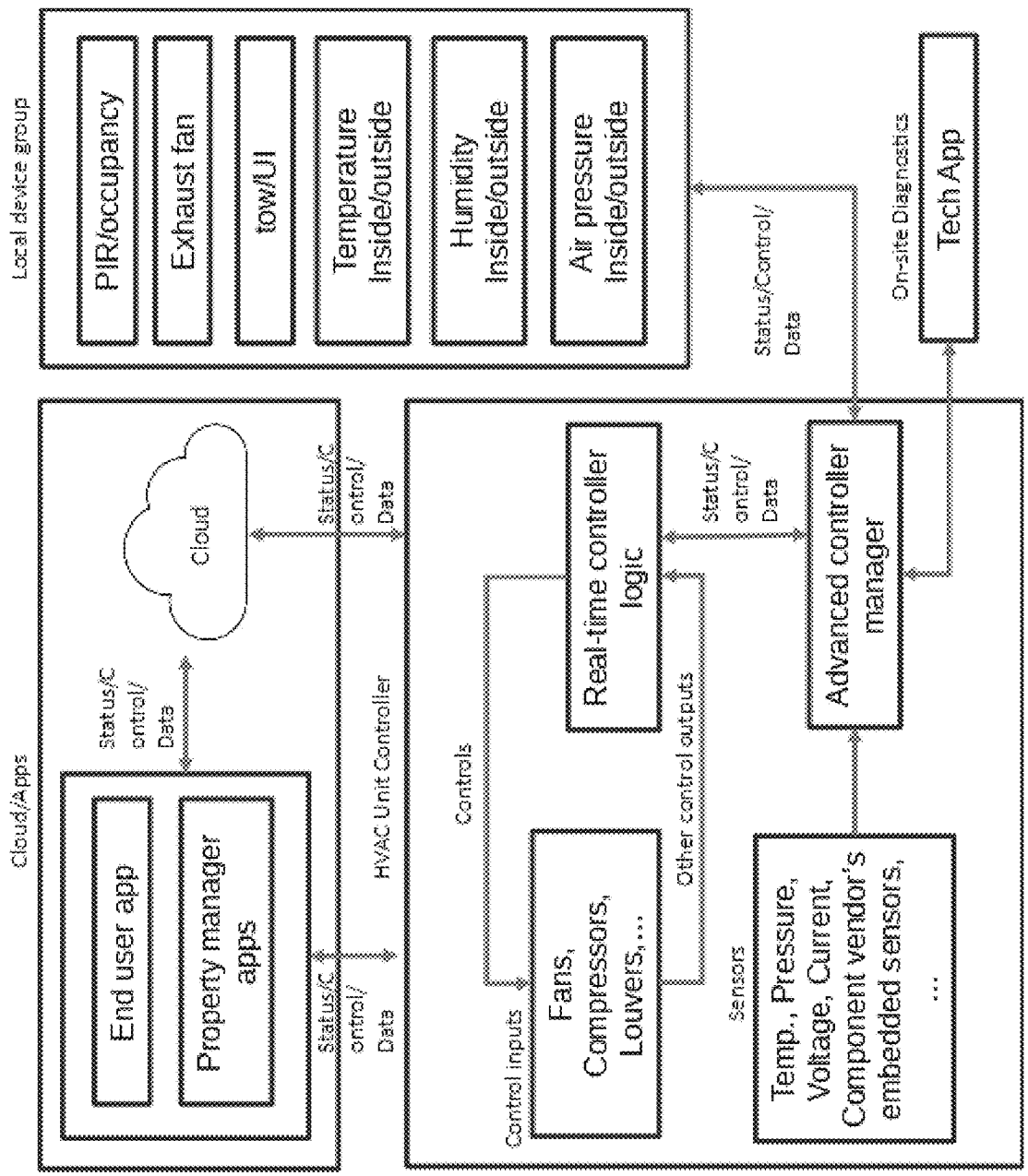
FIG. 12 illustrates a networked HVAC system control architecture according to some embodiments.

Each HVAC unit also can be configured with network interfacing and control capabilities for networking with HVAC units in other units or for networking with an external network, such as a cloud based network. FIG. 12 illustrates a networked HVAC system control architecture according to some embodiments. The HVAC unit controller is of the type previously described and includes real-time control logic and advanced management control for executing programming according to received sensor data and control algorithms that enable the determination and generation of actionable control signaling directed to discrete controllable devices both in the HVAC unit itself (controllable HVAC components) and in the local device group considered part of the zone to which the HVAC unit is associated. The local device group also includes the variety of sensors that sense corresponding conditions of the zone and provide sensed data to the HVAC unit controller. Data received by the HVAC unit controller also includes the current state of controllable devices in the local device group as well as user input data from a human-machine interface connected to the HVAC unit. User input via the human-machine interface, for example a temperature setting entered manually, either through the human-machine interface on the HVAC unit itself or via cellular telephone application, may be one of the inputs which feeds into the HVAC unit controller. On-site diagnostics also can be provided to and from the HVAC unit controller via an external device using a technical application. In addition to having networking capabilities with the local device group, the HVAC unit controller is also connected to an external network, such as a cloud based network. Current states of the controllable local devices and HVAC components, along with sensed data, can be transmitted to the external network and any externally connected control device or devices, such as a central control device, and applications within the central control device.

Figure 13:
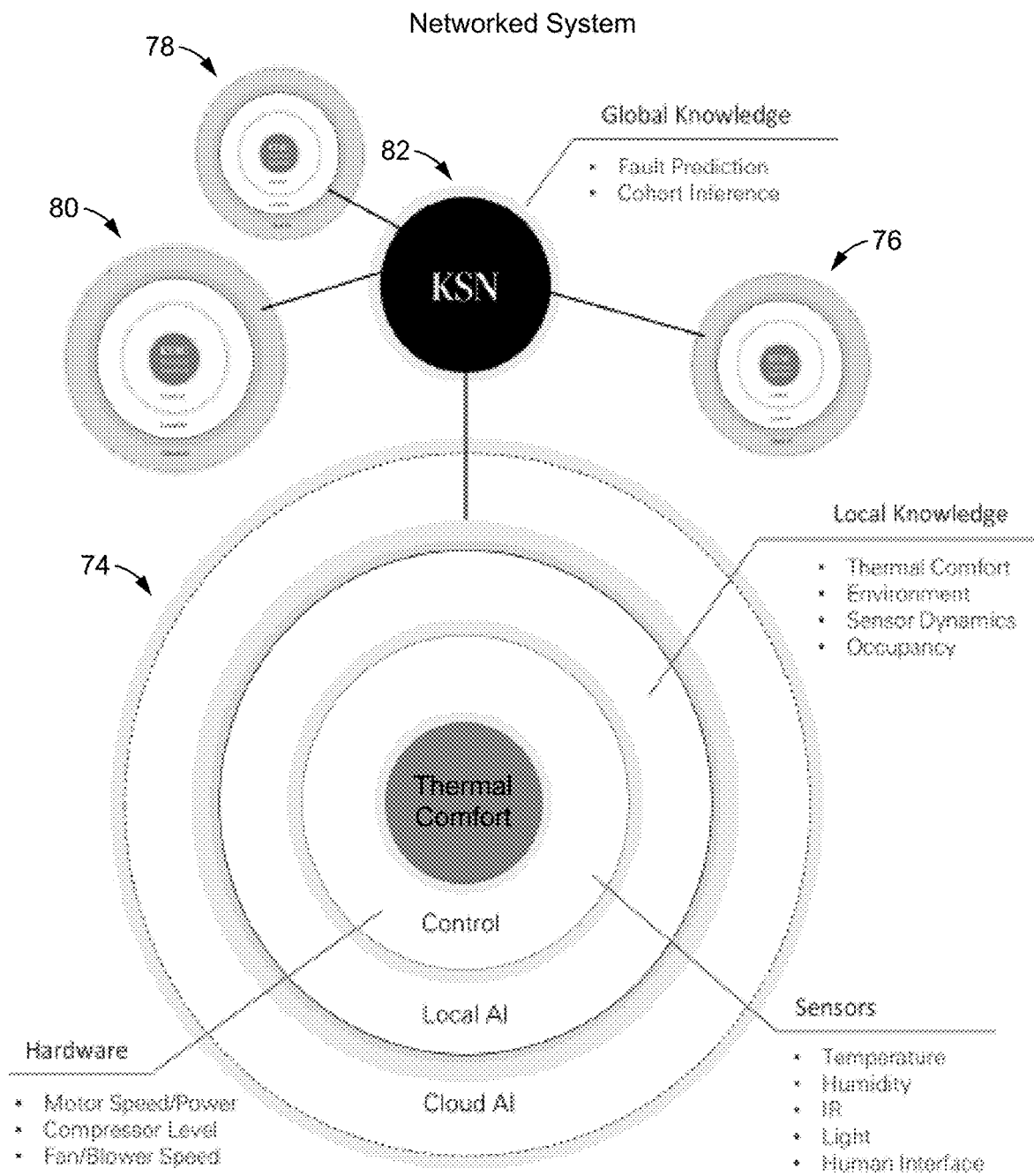
FIG. 13 illustrates a conceptual block diagram of a network of interconnected HVAC units according to some embodiments.

Any number of HVAC units can be connected to the external network, and the central control device distributes the data provided from the connected HVAC units to each of the other connected HVAC units. FIG. 13 illustrates a conceptual block diagram of a network of interconnected HVAC units according to some embodiments. The exemplary networked HVAC system shown in FIG. 13 has four discrete HVAC units 74, 76, 78, and 80 each connected to a central control device 82 via an external network. Each discrete HVAC unit has access to the local device group and associated controllable devices and sensed data, as well as control over the controllable devices in the HVAC unit itself and the local device group. The states of the controllable devices and the sensed data from the sensors can be tracked and stored over time, which provides statistically rich data used as the basis for intelligent decision making Local knowledge, i.e. at the level of each discrete HVAC unit and corresponding zone, is acquired for the generation of various models, such as thermal comfort models, environment models, sensor dynamics models, and occupancy models, that can be applied as control algorithms for controlling the controllable devices within the HVAC system, both at a discrete device level and at a system level taking into account coordination of multiple discrete devices. For example, to the extent that negative or positive pressure caused by one (first) HVAC unit may impact a zone being conditioned by another (second) HVAC unit, each HVAC controller can include a control algorithm to mitigate or compensate, either by modifying the second HVAC unit settings, or, less likely, informing and requesting, within the comfort model limits of the first HVAC unit, that the settings of the first HVAC unit be changed.

Data at the local level enables distributed learning at each of the discrete HVAC units, while network connection and aggregation from the discrete devices in the network enables real-time analytics and reporting. Learning models enable profiling of the physical environment and response characteristics to provide thermal comfort control within each of the various zones of the HVAC system. Edge computing, such as local control at each discrete HVAC unit, enables execution of all thermal comfort control activities. Environmental models account for fluid dynamics, thermodynamics, moisture transport, weather, and occupancy behavior. Deep learning predictive models simultaneously ensure occupancy preferences are met while reducing energy usage. Game-theoretic control harnesses multiple HVAC units working together. Predictive maintenance models deploy ready fault prediction methods, and advanced anomaly detection provides rapid identification of system faults. In general, machine learning at each HVAC unit enables analysis and related actions corresponding to system performance, system functions, condition based maintenance, fault detection and diagnostics, reporting, and implementation of the various models for improved comfort and energy efficiency. The local level models can be aggregated at the system level by the central controller for further analytics and rule set generation.

Figure 14:
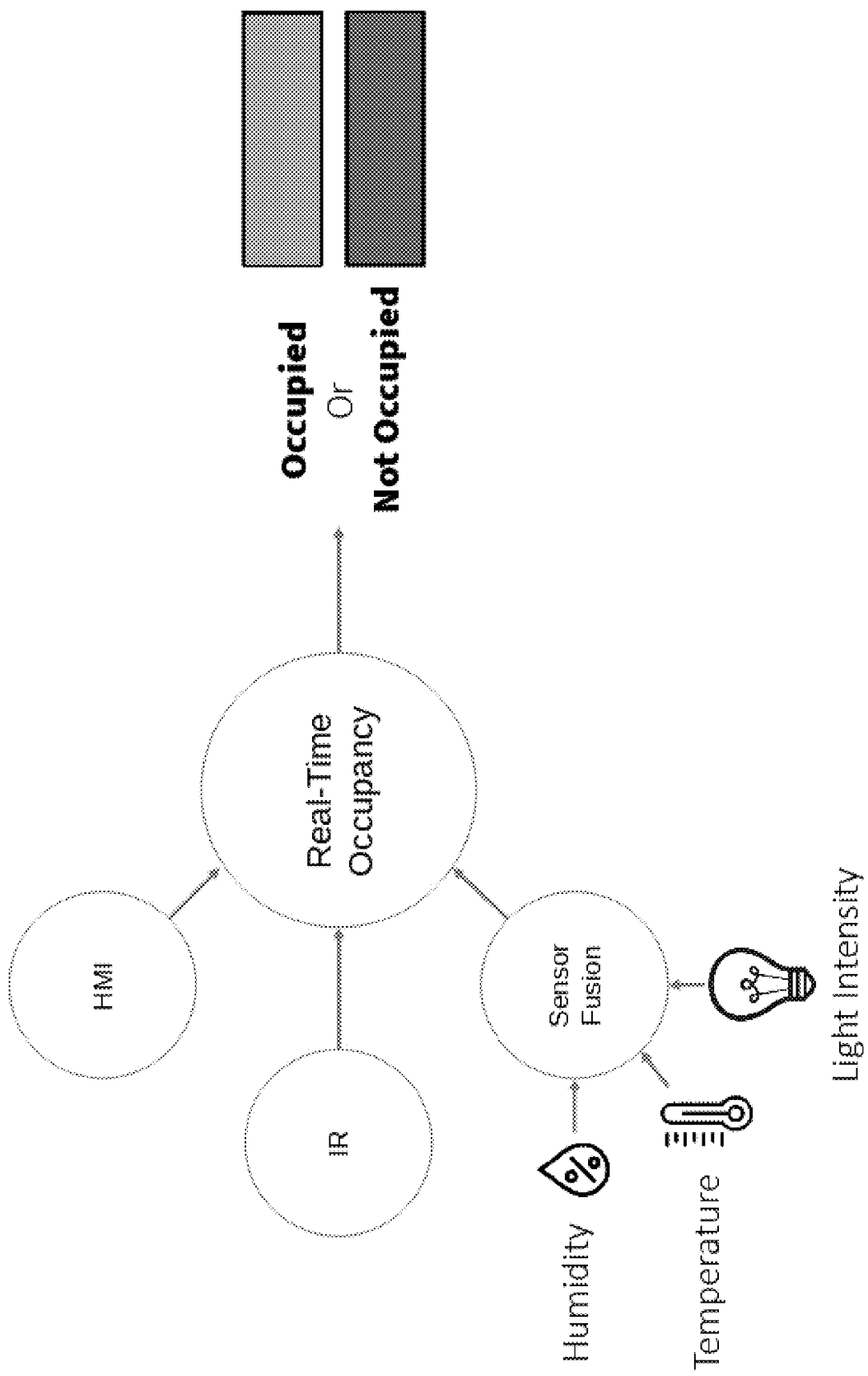
FIG. 14 illustrates a conceptual diagram of the correlation of occupancy and condition data to form a real-time zone occupancy model according to some embodiments.

As described above, data analysis can be performed to generate various models with corresponding actionable control of discrete controllable HVAC components and local devices. These models can be adapted over time according to newly received data, e.g. learning models. The models can be implemented in both real-time and as predictors for anticipated actions to be performed. By way of example, a zone occupancy model is described. A zone occupancy model details the occupancy of a zone according to sensed data obtained from an occupancy sensor positioned in the zone. In addition to determining an occupancy state, the HVAC unit controller senses zone conditions, e.g. humidity temperature, light intensity, etc. This sensed data is correlated to construct zone-specific high-fidelity occupancy information. FIG. 14 illustrates a conceptual diagram of the correlation of occupancy and condition data to form a real-time zone occupancy model according to some embodiments. The occupancy model correlates specific condition data to when a zone is occupied and to when the zone is not occupied. In some embodiments, the occupancy sensor is an infrared sensor. In other embodiments, the occupancy sensor is a motion detection sensor. It is understood that other types of sensors or sensor combinations can be used to determine occupancy of a zone.

Over time, the HVAC unit controller and/or the HVAC system controller learns the conditions and resulting actions over time, either continuously or periodically, for both occupied states and a not occupied states. In this manner, it can be learned how each HVAC unit functions at various times, such as specific days, weeks, and months in order to maintain a certain comfort profile, where a comfort profile is considered to be certain conditions levels at certain times. As used herein, a comfort model refers to a matrix of airflow, temperature, and humidity values that define a 3 D mathematical space which represents various zones of comfort. The collective modeling of such comfort is referred to as a comfort model, which can be represented on a per zone basis. The comfort model can utilize various comfort indicators and corresponding values, such as a comfort index.

Figure 15:
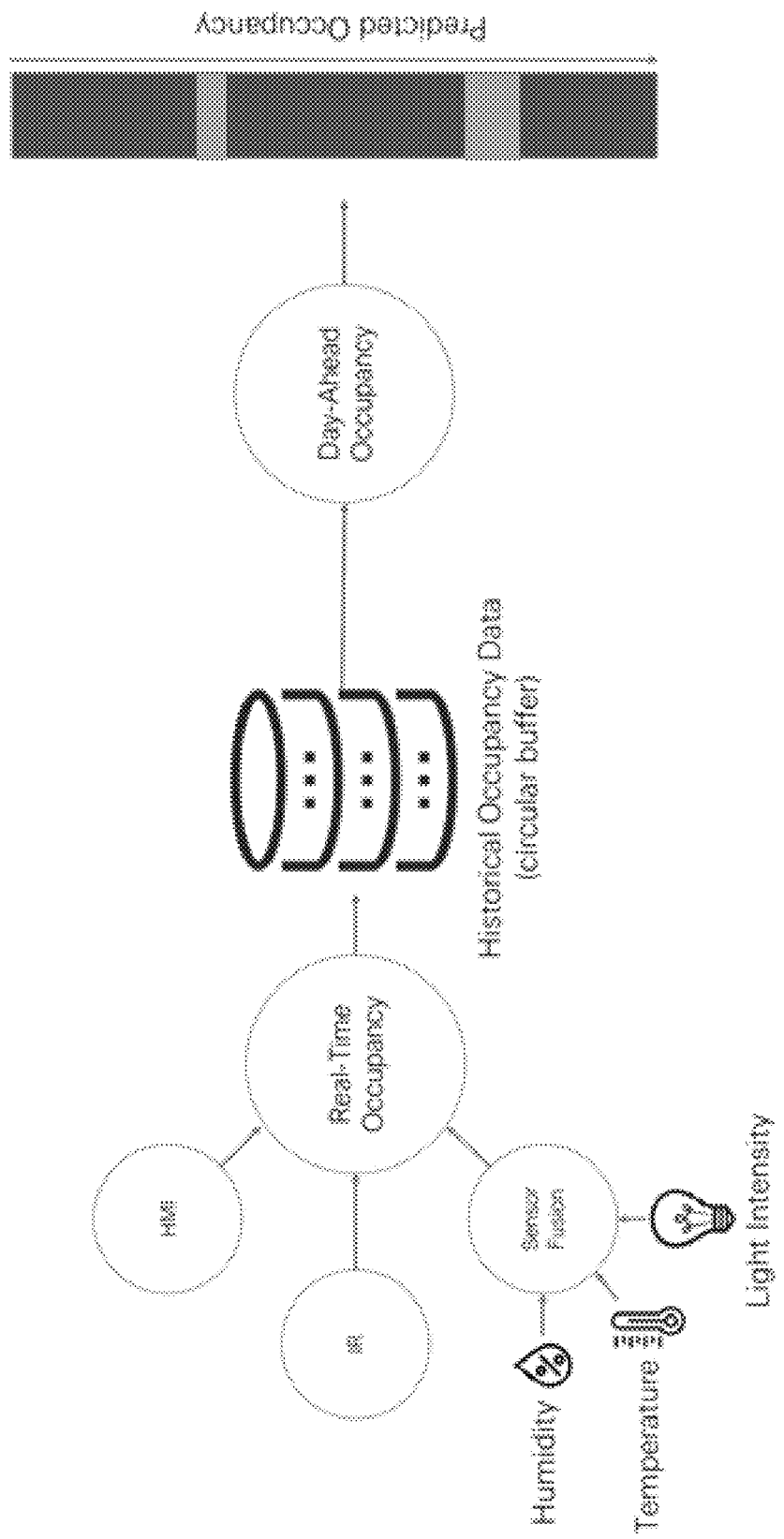
FIG. 15 illustrates a conceptual diagram of the correlation of occupancy and condition data over time to form a zone occupancy model according to some embodiments.

Using a comfort indicator level, such as the comfort index, is often more beneficial than simply using a single variable such as temperature. For example, at a given temperature, a user comfort level will be greater for a user at certain humidity levels and airflow rates then at others. A principle here is to control two or more variables that make up the comfort index to achieve an improved comfort index level. FIG. 15 illustrates a conceptual diagram of the correlation of occupancy and condition data over time to form a zone occupancy model according to some embodiments. The zone occupancy model builds upon the real-time zone occupancy model of FIG. 14 by collecting occupancy and conditions data over time. A prediction algorithm is applied to this historical data. In the exemplary application shown in FIG. 15, a day-ahead zone occupancy model is established by determining predicted occupancy and conditions, according to the historical data and prediction algorithm, for the next 24-hour period. The day-ahead zone occupancy model determines anticipated time frames where the zone will be occupied and un-occupied over the next 24-hours and corresponding conditions, e.g. typical humidity and temperature levels at specific times. The day-ahead zone occupancy model also determines the states of corresponding controllable HVAC components and local devices associated with the zone in order to met the anticipated conditions, and the actions required to achieve those conditions. In anticipation of meeting the predicted conditions during the established time frames, the HVAC unit controller can generate the appropriate control commands, at the appropriate times, corresponding to the required actions established by the day-ahead zone occupancy model. In this manner, historical comfort conditions within the zone can be automatically achieved without occupant or other user input. The time frames for establishing occupancy and related conditions can be established with a set resolution, such as 15 minutes, or can be adjusted to narrower or broader resolutions. The prediction algorithms can be configured to adaptively select between simple (high bias, low variance) and complex (low bias, high variance) determinations. It is understood that the zone occupancy model can be adapted to predict occupancy and conditions over time frames other than 24-hours. The prediction algorithm can also take into account the season of the year, such as summer versus winter, and the anticipated impact that may have on anticipated conditions to be met. By way of example, say Bob lives in the unit. Over time, the collection os sensed and state data over time enables the one or more HVAC unit controllers in Bob's unit to learn and predict Bob's occupancy patterns and comfort levels within each of the zones. The models implemented by the HVAC unit controllers enable the system to anticipate when Bob may or may not be home and operate the HVAC units to prepare the zones according to Bob's typical comfort levels for a given time, day, week, or even month.

Figure 16:
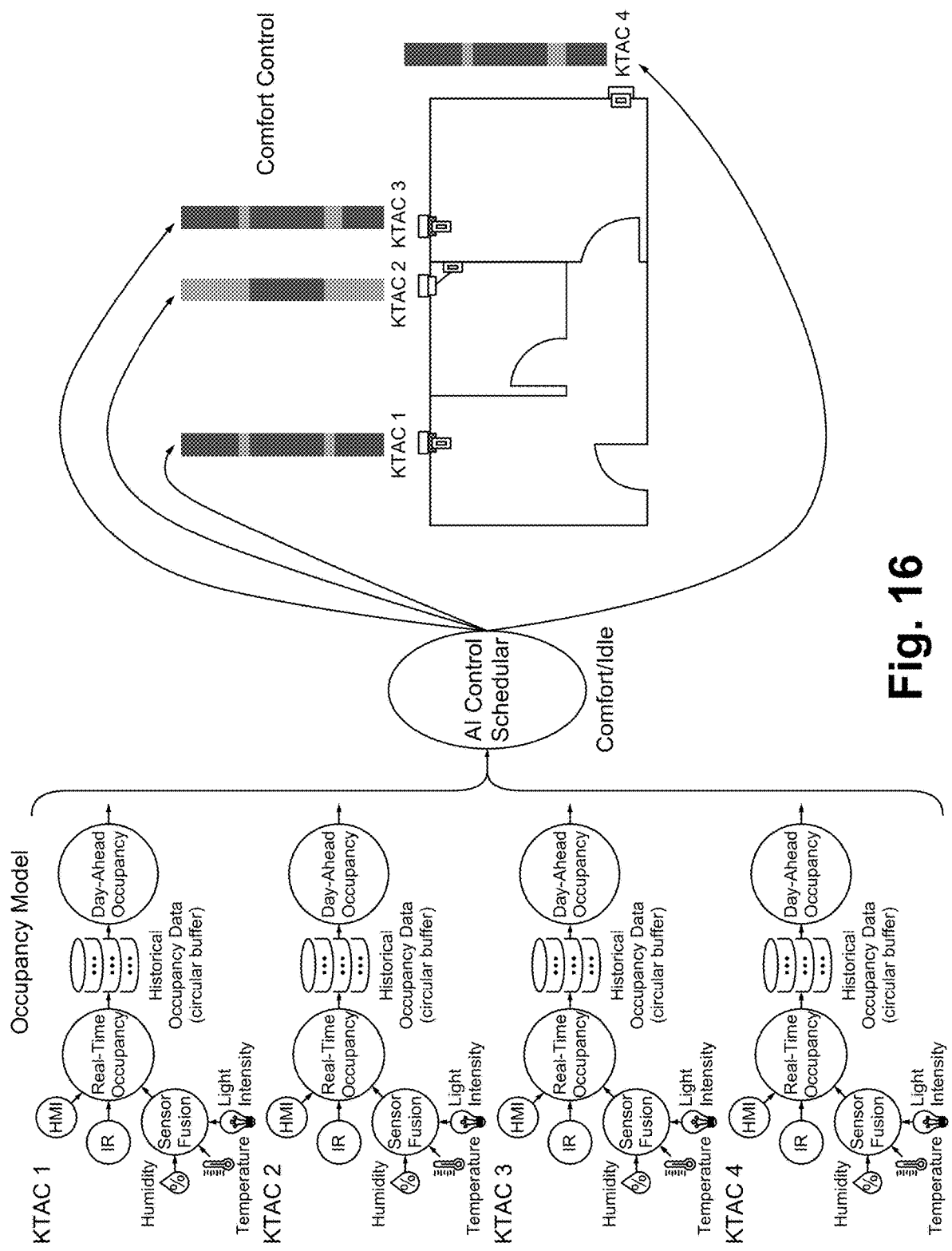
FIG. 16 illustrates the zone occupancy model applied to a multiple zone configuration according to some embodiments.

As the networked HVAC system enables coordination between discrete HVAC units and other controllable devices in the system, such as exhaust fans, the zone occupancy model can be expanded and predictive comfort control can be applied to multiple zones. FIG. 16 illustrates the zone occupancy model applied to a multiple zone configuration according to some embodiments. In this exemplary case, the multiple zone configuration encompasses four different zones corresponding to four HVAC units, e.g. HVAC unit 1 in a first room, HVAC unit 2 in a second room, and HVAC unit 3 and HVAC unit 4 in a third room. A zone occupancy model is established for each of the four zones as determined by the occupancy and condition data collected over time, in addition to the corresponding states of each of the controllable devices associated with each zone over that same time. The zone occupancy models are executed by a control scheduler. A control scheduler can be included within each of the discrete HVAC units, or the control scheduler can be implemented by a central control in an external network. In some embodiments, environmental models can also be utilized to achieve results predicted by the zone occupancy model and to meet desired comfort levels. Environmental models are used to model airflow distribution and resulting temperature variances and changes over time as conditioned air is output from the HVAC unit into the zone. Using environmental models, optimal modes/stages for controllable devices can be implemented. More complex models also can be implemented whereby the conditions in zones are monitored and analyzed to determine how operation of one HVAC unit influences the conditions in other zones, and thereby the operations of the HVAC units corresponding to those other zones. Additional modeling also can be done to account for whether or not a specific zone is isolated or not. For example, door sensors can be used to determine if a door is open or closed, such as the door entering the room including HVAC unit 3 and HVAC unit 4 in FIG. 16. If the door between a first room and a second room is closed, then one model can be used. If the door is open, then another model can be used since in this case the conditions in the first room may impact the conditions in the second room.

The present application has been described in terms of specific embodiments incorporating details to facilitate the understanding of the principles of construction and operation of the HVAC system. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A heating, ventilation, and air condition (HVAC) system, comprising:
a plurality of discrete HVAC units, wherein each HVAC unit of the plurality of discrete HVAC units is configured to condition a zone associated with the HVAC unit, and each of the plurality of discrete HVAC units are networked together, wherein each HVAC unit comprises an HVAC unit controller, one or more controllable HVAC components, and a network interface, wherein the network interface is configured to transmit zone condition data of the zone associated with the corresponding HVAC unit and HVAC component operational state data of the corresponding HVAC unit to each of the other HVAC units of the plurality of discrete HVAC units, and to receive zone condition data and HVAC component operational state data from each of the other HVAC units, and wherein for each HVAC unit, the corresponding HVAC unit controller is configured to independently operate and control the corresponding controllable HVAC components according to the zone condition data and the HVAC component operational state data corresponding to the HVAC unit and according to the zone condition data and the HVAC component operational state data received from the other HVAC units to enable discrete zone control by each HVAC unit controller using local zone condition data and the HVAC component operational state data as well as external zone condition data and the HVAC component operational state data from each of the other HVAC units; and a plurality of sensors positioned in each zone, wherein each sensor of the plurality of sensors is coupled to the HVAC unit controller of the HVAC unit associated with the zone, and is configured to sense a condition characteristic of the zone and transmit corresponding sensed zone condition characteristic data to the HVAC unit controller.

2. The HVAC system of claim 1, wherein the condition characteristic is one of a temperature, humidity, or air flow rate.

3. The HVAC system of claim 1, wherein each of the plurality of discrete HVAC units are networked together by a wired or a wireless connection.

4. The HVAC system of claim 1, wherein each of the plurality of discrete HVAC units are networked together by an external network.

5. The HVAC system of claim 4, wherein each of the plurality of discrete HVAC units are connected to the external network by a wired or a wireless connection.

6. The HVAC system of claim 4, wherein the external network comprises a central controller.

7. The HVAC system of claim 6, wherein each of the plurality of discrete HVAC units is configured to transmit the zone condition data and the HVAC component operational state data to the central controller.

8. The HVAC system of claim 7, wherein the central controller is configured to distribute the zone condition data and the HVAC component operational state data received from each of the plurality of discrete HVAC units to each of the other HVAC units.

9. The HVAC system of claim 7, wherein the central controller is further configured to transmit rule sets to each of the plurality of discrete HVAC units, and wherein each rule set defines how each specific HVAC unit is to utilize and implement the zone condition data and the HVAC component operational state data received from each of the other HVAC units.

10. The HVAC system of claim 1, wherein each HVAC unit further comprises a human-machine interface for receiving a user input that sets one or more zone conditions to a specific value.

11. The HVAC system of claim 1, wherein the HVAC unit controller of each HVAC unit is further configured to apply programmed logic, stored control algorithms, and state tables to determine control signaling for the one or more controllable HVAC components.

12. The HVAC system of claim 1, wherein the one or more controllable HVAC components comprise a compressor, a metering device, a blower fan for blowing air over an evaporator coil, a condenser fan, and a balancing damper positioned proximate to an air intake opening.

13. A heating, ventilation, and air condition (HVAC) system, comprising:

a first HVAC unit configured to condition air within a first zone, wherein the first HVAC unit is a first singular unit comprising a first HVAC unit controller, one or more first controllable HVAC components, a first network interface, and a first air intake opening for in-taking air external to the first zone and any other zone conditioned by the first HVAC unit in response to an operation of one of the one or more first controllable HVAC components;

an exhaust device positioned within the first zone and physically separate from the first singular unit of the first HVAC unit, wherein the exhaust device is communicatively coupled to the first HVAC unit controller, and wherein the exhaust device is configured to exhaust air from the first zone and any other zone conditioned by the first HVAC unit in response to a control signal received from the first HVAC unit controller;

a first set of one or more sensors positioned within the first zone or any other zone conditioned by the first HVAC unit and coupled to the first HVAC unit controller, and a second set of one or more sensors positioned outside the first zone conditioned by the first HVAC unit and coupled to the first HVAC unit controller, wherein data sensed on the first and second sets of one or more sensors are used to control conditions in the first zone, a second HVAC unit configured to condition air within a second zone, wherein the second HVAC unit is a second singular unit comprising a second HVAC unit controller, one or more second controllable HVAC components, a second network interface, and a second air intake opening for in-taking air external to the second zone and any other zone conditioned by the second HVAC unit in response to an operation of one of the one or more second controllable HVAC components;

wherein at least one of the first network interface and the second network interface is configured to transmit zone condition data and HVAC component operational state data of a corresponding one of the first and second HVAC units to the network interface of the other of the first and second HVAC units, the first and second HVAC units configured to coordinate settings of one of the first and second HVAC units to compensate for conditions in one of the first and second zones affecting conditions in the other of the first and second zones.

14. The HVAC system of claim 13, wherein the first HVAC unit controller is further configured to operate one of the one or more first controllable HVAC components in response to sensing a sensed condition within the first zone.

15. The HVAC system of claim 13, wherein the first HVAC unit controller is further configured to send the control signal to the exhaust device in response to sensing a sensed condition within the first zone.

16. The HVAC system of claim 13, wherein the one or more first controllable HVAC components comprise a compressor, a metering device, a blower fan for blowing air over an evaporator coil, a condenser fan, and a balancing damper positioned proximate to the air intake opening.

17. The HVAC system of claim 13, wherein one of the one or more first controllable HVAC components is a balancing damper.

18. The HVAC system of claim 13, further comprising a third air intake opening for in-taking air from within the first zone, wherein the third air intake opening is separate from the first air intake opening for in-taking air external to the first zone, wherein the air in-taken from the third air intake opening is mixed with the air in-taken from the first air intake opening, and wherein the mixed air is output from the first HVAC unit into the first zone.

19. The HVAC system of claim 13, wherein in-taking air external to the first zone and any other zone conditioned by the first HVAC unit configures an air circulation performed by the first HVAC unit as an open-loop.

20. The HVAC system of claim 15, wherein the first HVAC unit controller is further configured to send one of ON signal, OFF signal, or variable speed signal to the exhaust device based at least on a comparison of indoor conditions indicated by sensor readings of the first set of one or more sensors positioned within the first zone and outdoor conditions indicated by sensor readings of the second set of one or more sensors positioned outside the first zone.

21. The HVAC system of claim 13, wherein the conditions in one of the first and second zones comprise a negative pressure or a positive pressure.

\* \* \* \* \*